(12) United States Patent
Ichikawa et al.

(10) Patent No.: US 11,212,648 B2
(45) Date of Patent: Dec. 28, 2021

(54) INFORMATION PROCESSING APPARATUS, INFORMATION PROCESSING SYSTEM, AND PRIVACY PROTECTION PROGRAM

(71) Applicant: FUJITSU LIMITED, Kawasaki (JP)

(72) Inventors: Shizuko Ichikawa, Nara (JP); Junya Kani, Kawasaki (JP); Hisatoshi Yamaoka, Kawasaki (JP); Naoki Nishiguchi, Kawasaki (JP); Eiichi Takahashi, Kawasaki (JP); Kota Itakura, Kawasaki (JP); Akira Shiba, Kawasaki (JP); Miwa Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 16/376,582

(22) Filed: Apr. 5, 2019

(65) Prior Publication Data
US 2019/0320291 A1    Oct. 17, 2019

(30) Foreign Application Priority Data

Apr. 12, 2018  (JP) .............................. JP2018-076805

(51) Int. Cl.
*H04W 4/029*  (2018.01)
*H04W 4/021*  (2018.01)

(52) U.S. Cl.
CPC ........... *H04W 4/029* (2018.02); *H04W 4/021* (2013.01)

(58) Field of Classification Search
CPC ..... H04L 67/18; H04L 63/10; H04L 63/0407; H04L 67/22; H04W 4/029; H04W 4/021; H04W 12/02; H04W 12/00503; H04W 8/10; H04W 4/025; H04W 12/0013; H04W 4/21; H04W 88/02; H04M 2242/15; H04M 2250/10; H04M 3/42348
See application file for complete search history.

(56) References Cited

U.S. PATENT DOCUMENTS

| | | | | |
|---|---|---|---|---|
| 8,909,250 | B1 * | 12/2014 | Wang | H04W 4/023 455/456.1 |
| 2015/0160023 | A1 * | 6/2015 | Goel | H04W 4/024 701/400 |
| 2016/0360382 | A1 * | 12/2016 | Gross | G06F 3/016 |

FOREIGN PATENT DOCUMENTS

| | | |
|---|---|---|
| JP | 2009-296452 | 12/2009 |
| JP | 2009296452 A * | 12/2009 |

* cited by examiner

*Primary Examiner* — Yuwen Pan
*Assistant Examiner* — Jing Gao
(74) *Attorney, Agent, or Firm* — Fujitsu Patent Center

(57) ABSTRACT

A system for privacy protection includes a processor and a terminal including a location detection device. The processor performs: identifying a presence possible ranges of the terminal at a first time and at a second time earlier than the first time from a combination of information on a first region including the location at the first time, and information on a second region including the location at the second time and having been already transmitted to an external apparatus; determining whether each of the identified presence possible ranges satisfies a preset condition for a presence possible range that may be known by a third party; when the condition is not satisfied, transmitting the information on a third region including the first region and a region other than the first region, as information on a region where the terminal is present at the first time, to the external apparatus.

17 Claims, 32 Drawing Sheets

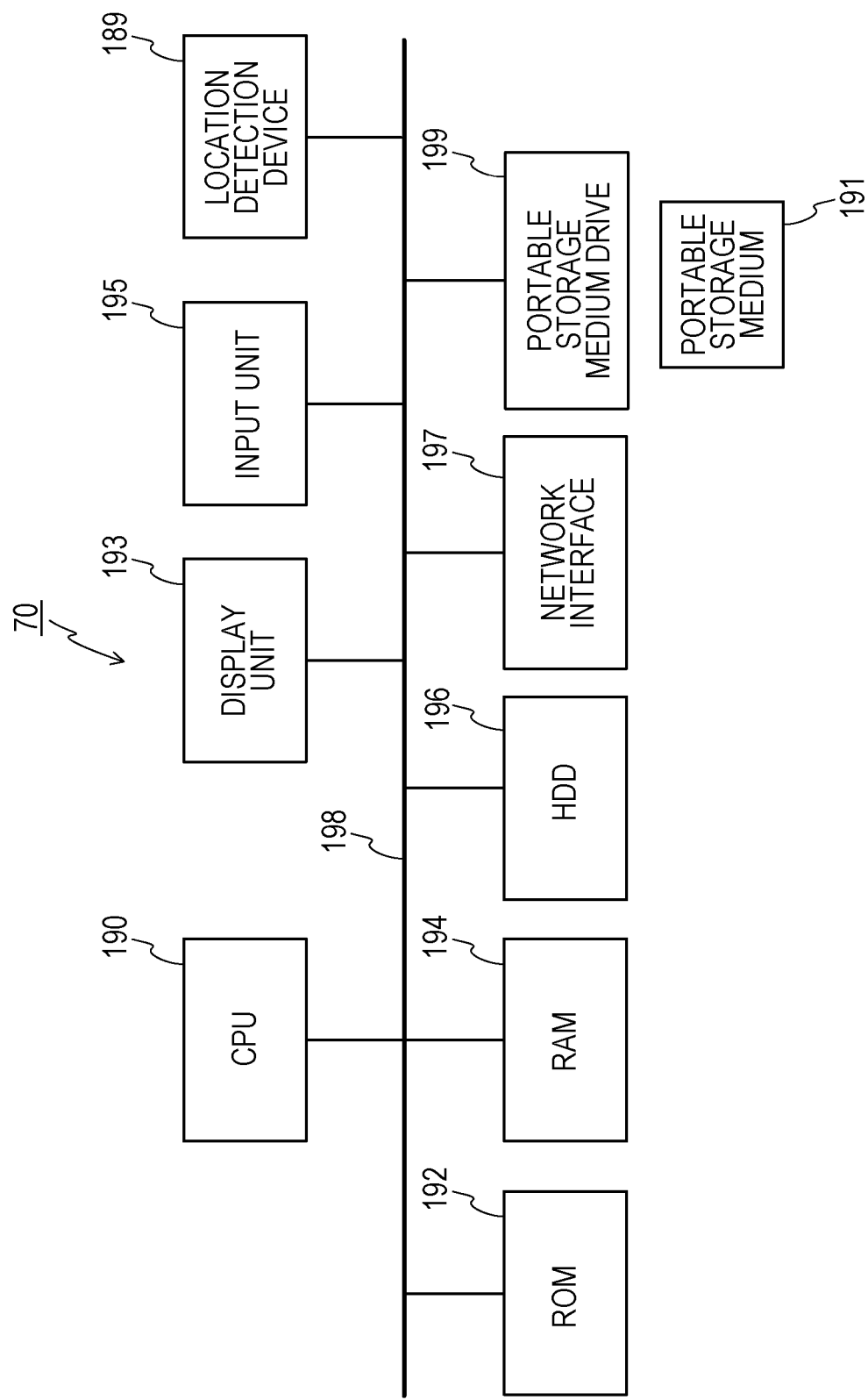

FIG. 4

| USER ID | PRIVACY PROTECTION CONDITION FOR ABSTRACTION | PRIVACY PROTECTION CONDITION FOR INVASION DETERMINATION |
|---|---|---|
| A | CITY | 70% OR MORE OF PRESENCE REGION |
| B | PREFECTURE | 30 km² OR LARGER |
| C | BLOCK | 80% OR MORE OF PRESENCE REGION |

FIG. 5A

| DATE/TIME | PRESENCE REGION INFORMATION | DUMMY REGION INFORMATION | PRESENCE POSSIBLE RANGE |
|---|---|---|---|
| 10/25/2017 12:00:00 | NAKANO-CITY | — | [(35.7267,139.6602),(35.7258,139.6402), (35.7354,139.6329),(35.7301,139.6245), (35.7176,139.6329),(35.7096,139.6579), (35.6920,139.6680),(35.6859,139.6598), (35.6786,139.6654),(35.6981,139.6871), (35.7106,139.6933),(35.7108,139.6802), (35.7185,139.6740),(35.7304,139.6770), (35.7318,139.6687) ...] |

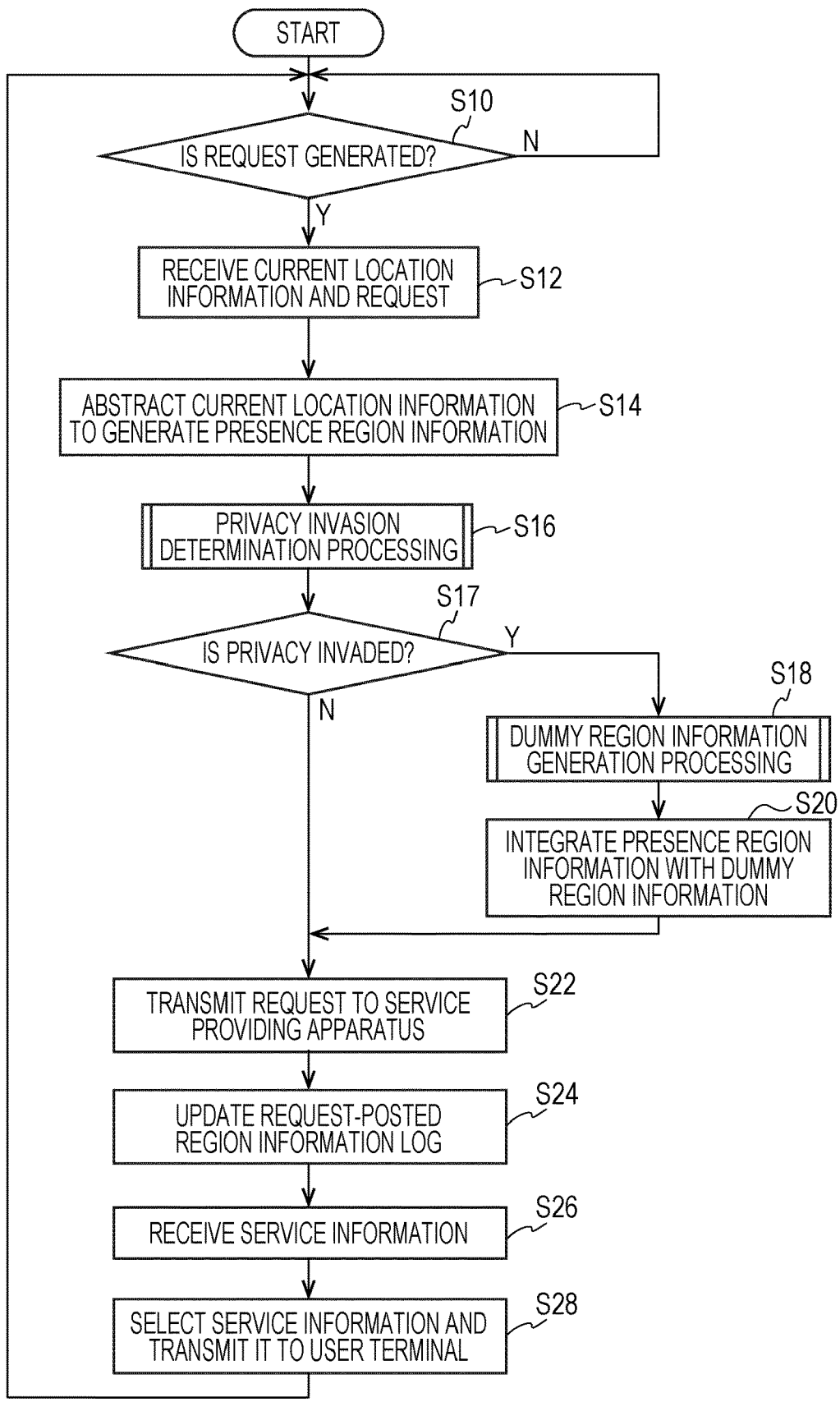

FIG. 9A

| DATE/TIME | PRESENCE REGION INFORMATION | DUMMY REGION INFORMATION | PRESENCE POSSIBLE RANGE |
|---|---|---|---|
| 10/25/2017 13:30:00 | SHIBUYA-CITY | — | [(35.6919,139.6837),(35.6754,139.6620), (35.6719,139.6622),(35.6724,139.6730), (35.6616,139.6877),(35.6418,139.7101), (35.6420,139.7194),(35.6467,139.7232), (35.6557,139.7221),(35.6646,139.7083), (35.6807,139.7140),(35.6886,139.7014), (35.6816,139.6876)···] |

FIG. 9B

| DATE/TIME | PRESENCE REGION INFORMATION | DUMMY REGION INFORMATION | PRESENCE POSSIBLE RANGE |
|---|---|---|---|
| 10/25/2017 13:30:00 | SHIBUYA-CITY | — | [(35.6919,139.6837),(35.6754,139.6620), (35.6719,139.6622),(35.6724,139.6730), (35.6616,139.6877),(35.6418,139.7101), (35.6420,139.7194),(35.6467,139.7232), (35.6557,139.7221),(35.6646,139.7083), (35.6807,139.7140),(35.6886,139.7014), (35.6816,139.6876)···] |
| 10/25/2017 14:00:00 | SETAGAYA-CITY | SUGINAMI-CITY, MEGURO-CITY, SHINAGAWA-CITY | [(35.7050,139.6598),(35.6813,139.6317), (35.6714,139.6243),(35.6469,139.6336), (35.6055,139.7248),(35.6115,139.7466), (35.6409,139.7174),(35.6416,139.7098), (35.6622,139.6853),(35.6636,139.6754), (35.6715,139.6707),(35.6730,139.6613), (35.6866,139.6587),(35.6924,139.6669)···] |

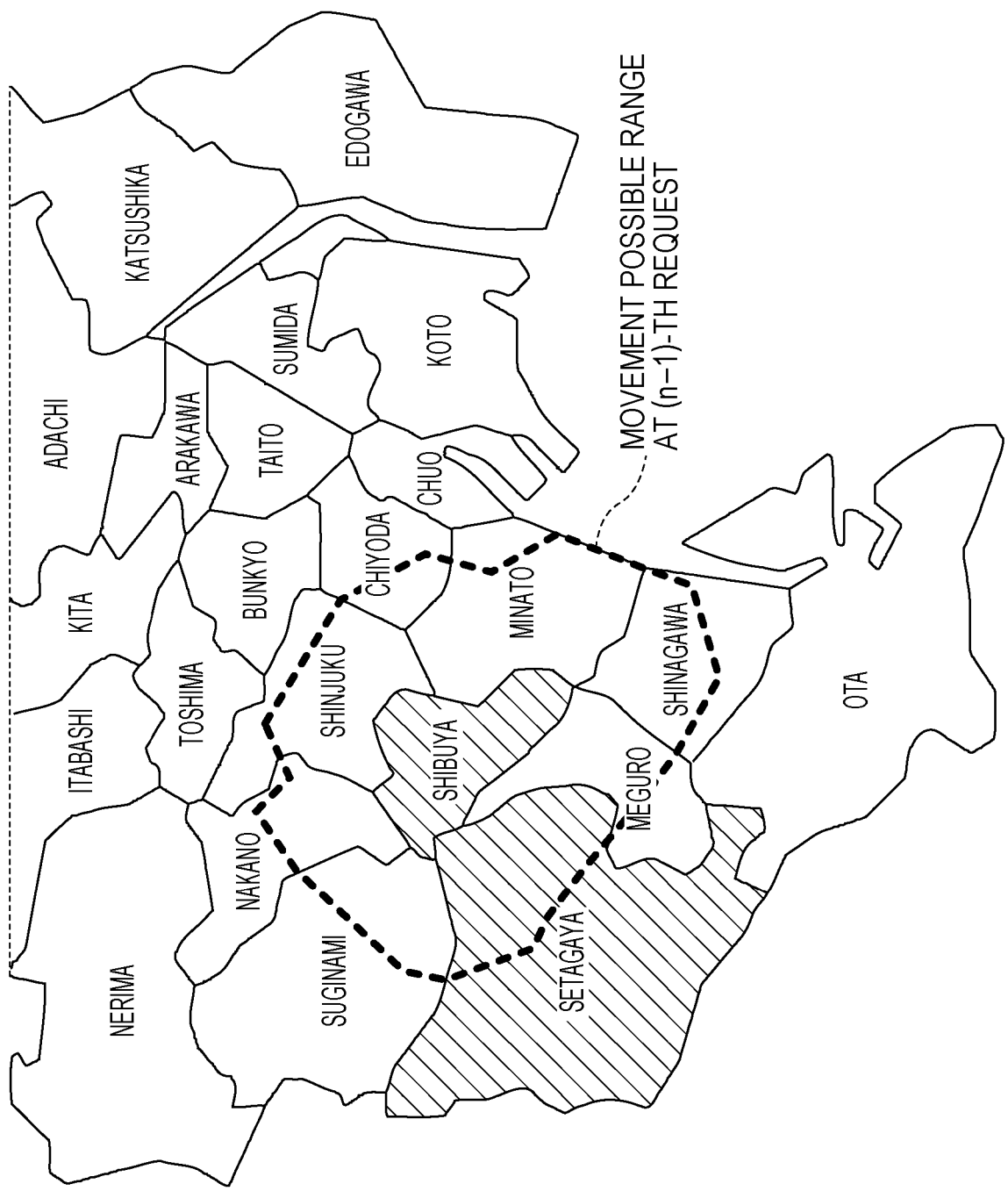

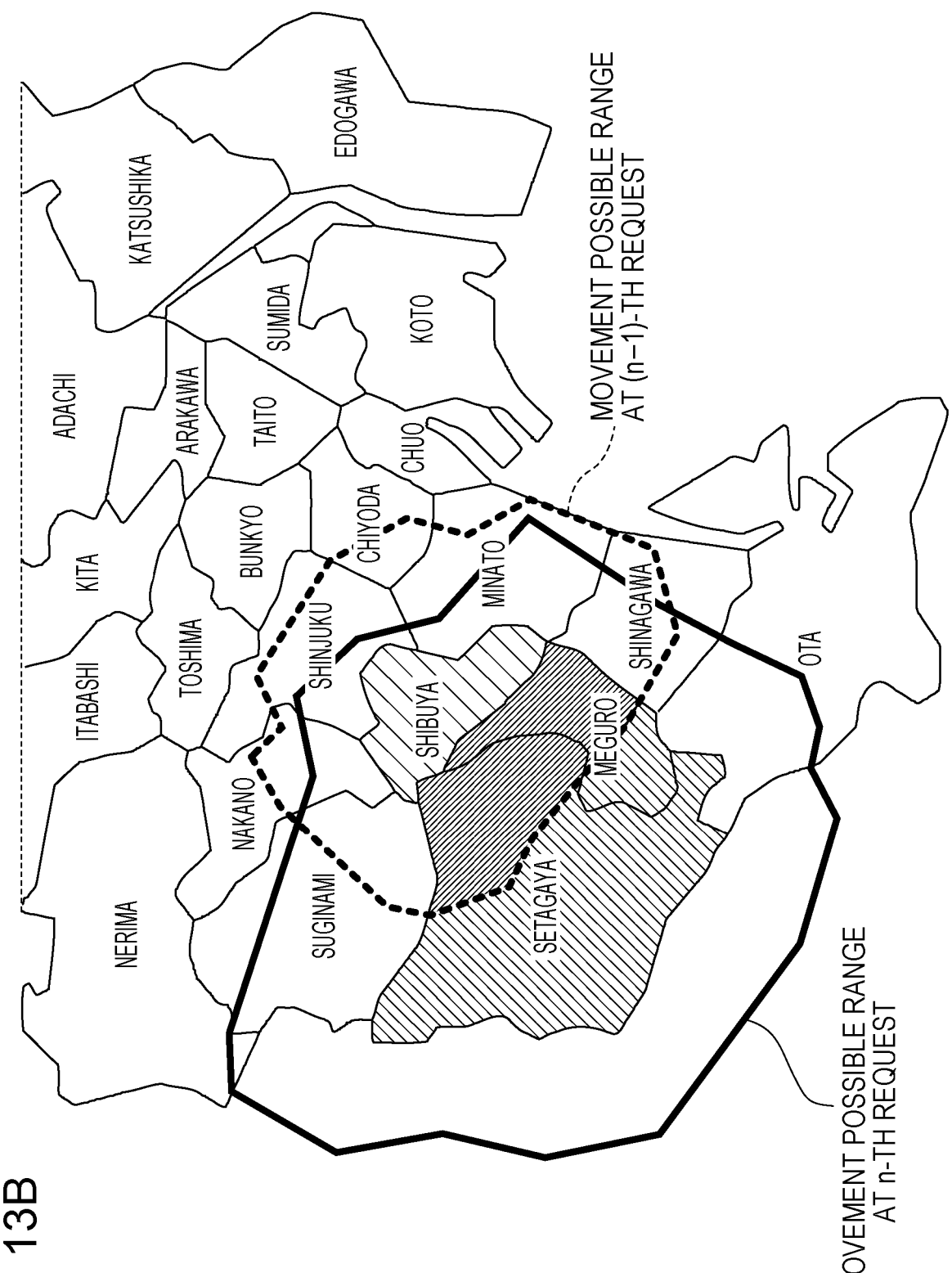

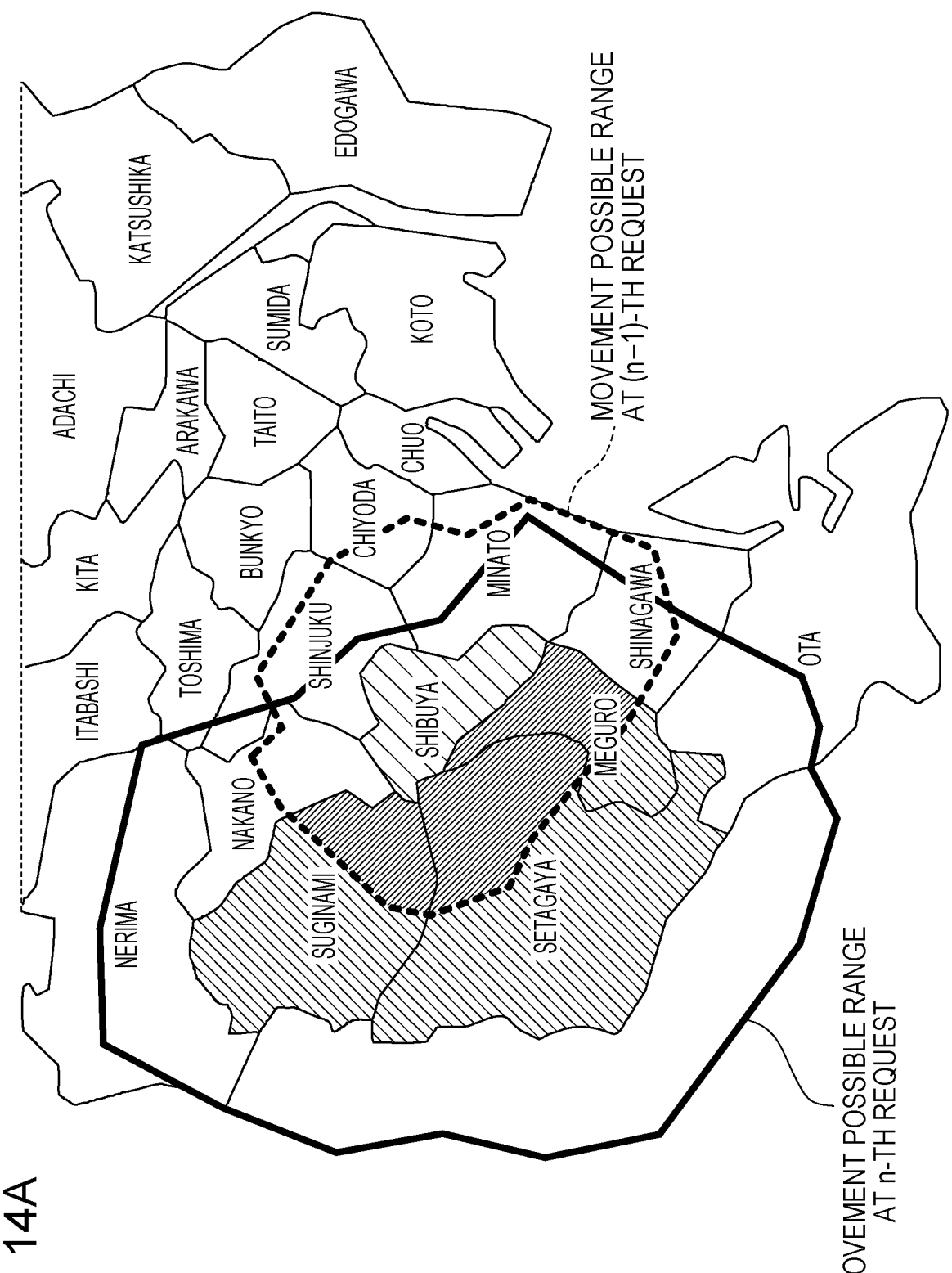

INFORMATION PROCESSING APPARATUS, INFORMATION PROCESSING SYSTEM, AND PRIVACY PROTECTION PROGRAM

CROSS-REFERENCE TO RELATED APPLICATION

This application is based upon and claims the benefit of priority of the prior Japanese Patent Application No. 2018-76805, filed on Apr. 12, 2018, the entire contents of which are incorporated herein by reference.

FIELD

The embodiments discussed herein are related to an information processing apparatus, an information processing system, and a privacy protection program.

BACKGROUND

Heretofore, there has been known a service in which real-time location information of a user is acquired from a terminal held by the user, and information relevant to the location is provided to the terminal based on the acquired location information. As the user who uses such service does not want to notify a service provider of detailed location information in some cases, location information to be transmitted from the terminal to the service provider may be abstracted location information of a presence location of the user. For example, the name of a city where the user is present may be used as location information to be transmitted from the terminal to the service provider. Related techniques are disclosed in, for example, Japanese Laid-open Patent Publication No. 2009-296452.

However, even if abstracted location information is transmitted at an individual time point, analyzing abstracted location information at a plurality of time points in combination can identify a narrow range that the user does not want someone to know as a range (presence range) where the user is present or was present in some cases. In such a case, there is a concern that the privacy of the user may be invaded.

One of conceivable methods of reducing such invasion of privacy is to set a wider region as an abstracted location of the presence location of the user. In this case, for example, the name of a prefecture can be used as location information to be transmitted from the terminal to the service provider. However, in this case, the service provider provides information relevant to the entire prefecture, which results in an enormous amount of information.

Moreover, another one of the conceivable methods of reducing such invasion of privacy is to delay the timing of transmitting the abstracted location information. However, this makes it impossible to provide information relevant to the location of the user in real time.

In one aspect of the embodiments discussed herein, provided are an information processing apparatus, an information processing system, and a privacy protection program capable of implementing the privacy protection when acquiring information relevant to a location from an external apparatus.

SUMMARY

According to an aspect of the embodiments, a system for privacy protection includes a terminal including a location detection device and a processor. The processor performs: identifying presence possible ranges of the terminal at a first time and at a second time earlier than the first time from a combination of information of a first region including the location at the first time, and information on a second region including the location at the second time and having been already transmitted to an external apparatus; determining whether each of the identified presence possible ranges satisfies a preset condition for a presence possible range that may be known by a third party; when the condition is not satisfied, transmitting the information of a third region including the first region and a region other than the first region, as information of a region where the terminal is present at the first time, to the external apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram illustrating a hardware configuration of a user terminal.

FIG. 4 is a diagram illustrating a privacy protection condition;

FIG. 5A is a diagram illustrating one example of an request-posted region information log.

FIG. 6 is a flowchart illustrating a series of processing in the personal data management server;

FIGS. 9A and 9B are diagrams illustrating transition of the request-posted region information log;

FIGS. 10A and 10B are diagrams (Part 1) for explaining the processing in FIGS. 6 to 8;

FIGS. 13A and 13B are diagrams (Part 4) for explaining the processing in FIGS. 6 to 8;

FIGS. 14A and 14B are diagrams (Part 5) for explaining the processing in FIGS. 6 to 8;

DESCRIPTION OF EMBODIMENTS

Figure 1:
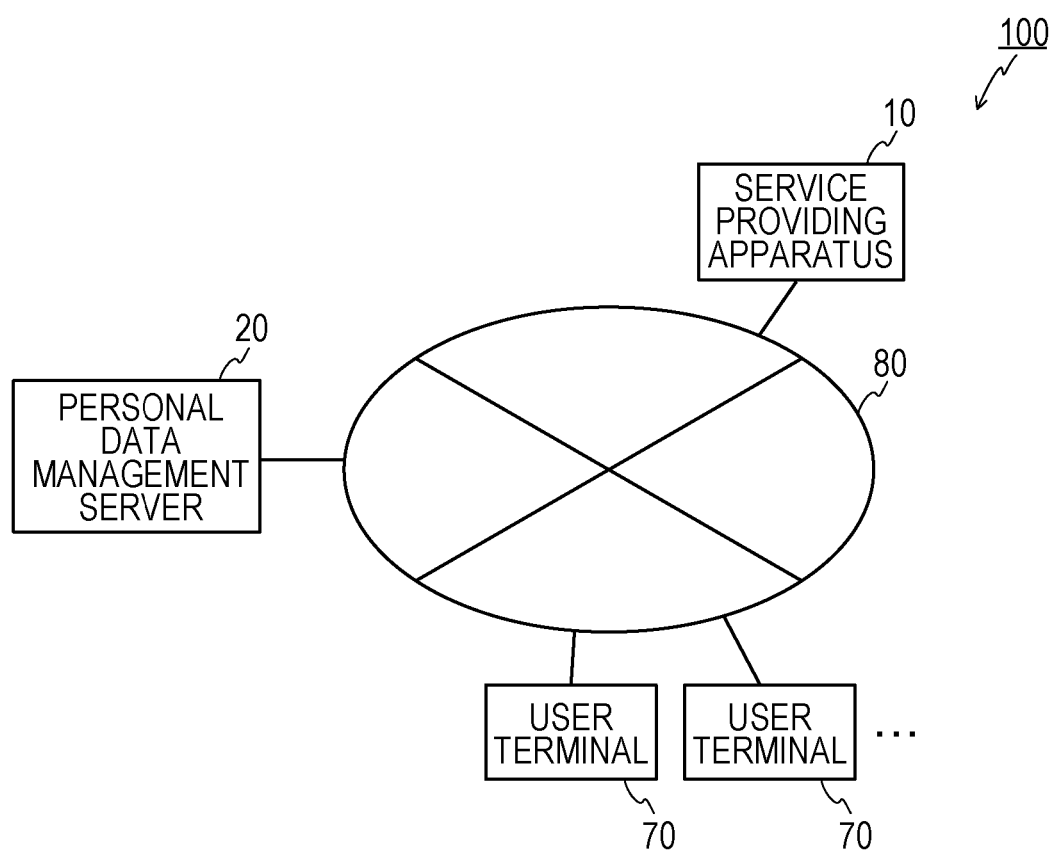
FIG. 1 is a diagram schematically illustrating a configuration of an information processing system according to one embodiment.

Hereinafter, one embodiment of an information processing system is described in details based on FIGS. 1 to 18B. FIG. 1 schematically illustrates a configuration of an information processing system 100 according to the one embodiment.

As illustrated in FIG. 1, the information processing system 100 includes user terminals 70 serving as terminals, a service providing apparatus 10 serving as an external apparatus, and a personal data management server 20 serving as an information processing apparatus. The user terminals 70, the service providing apparatus 10, and the personal data management server 20 are coupled to a network 80 such as the Internet.

The user terminal 70 is a terminal that can be carried by a user, such as a smartphone or a tablet-type terminal. FIG. 2A illustrates a hardware configuration of the user terminal 70. As illustrated in FIG. 2A, the user terminal 70 is provided with a central processing unit (CPU) 190, a read only memory (ROM) 192, a random access memory (RAM) 194, a storage unit (herein, hard disk drive (HDD)) 196, a network interface 197, a display unit 193, an input unit 195, a location detection device 189, a portable storage medium drive 199, and the like. The display unit 193 may include a liquid crystal display or the like, and the input unit 195 may include a touch panel, a physical button, a keyboard, or the like. The location detection device 189 may include a global positioning system (GPS) sensor or the like. These respective constituent units of the user terminal 70 are coupled to a bus 198. In the user terminal 70, the CPU 190 executes a program stored in the ROM 192 or the HDD 196 or a program read from a portable storage medium 191 by the portable storage medium drive 199, thereby implementing functions as a location information transmission unit 72 and a service information reception unit 74 illustrated in FIG. 3. Note that, the functions of the respective units in the user terminal 70 in FIG. 3 may be implemented, for example, by an integrated circuit, such as an application specific integrated circuit (ASIC) or a field programmable gate array (FPGA).

Figure 3:
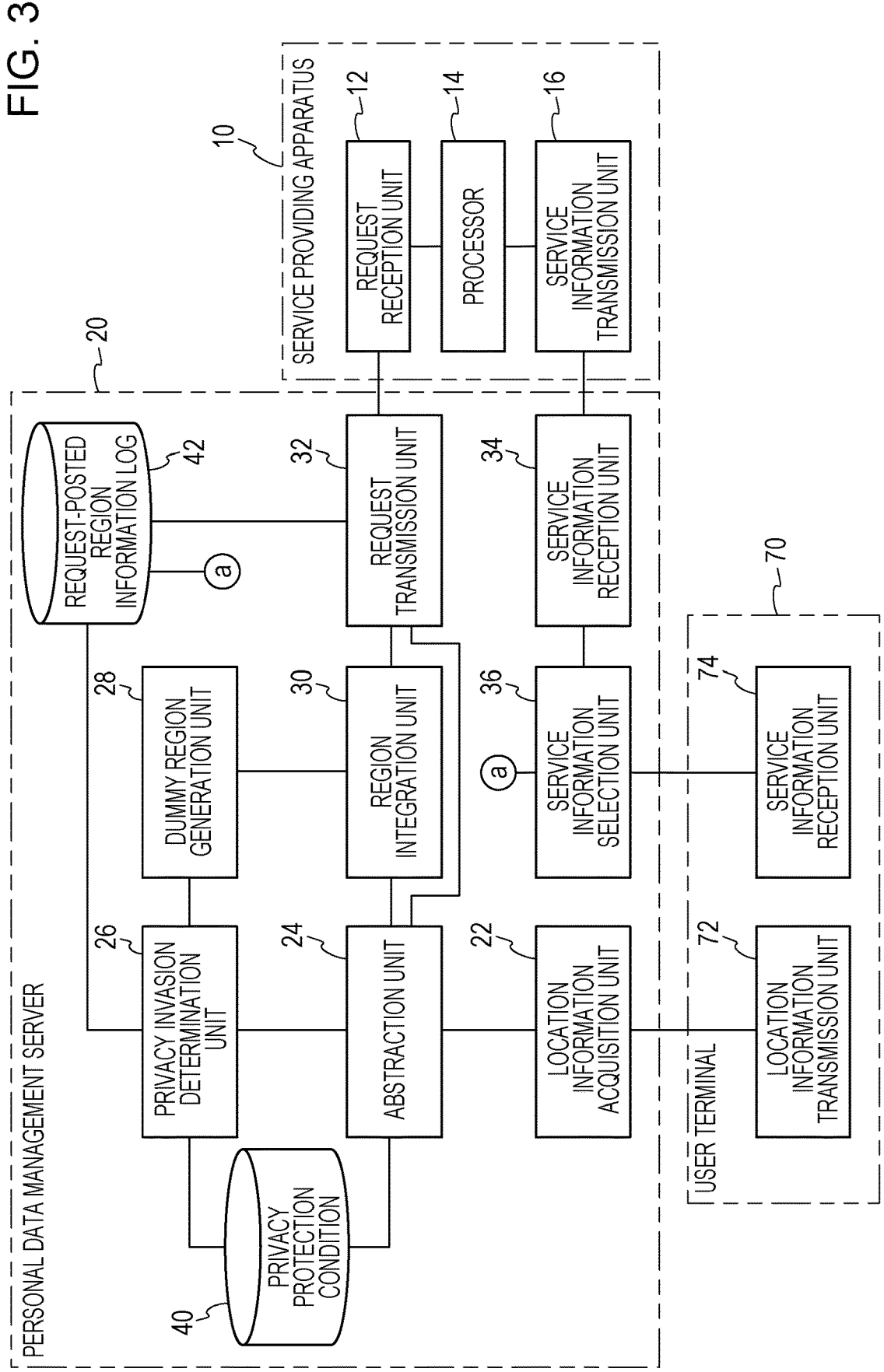
FIG. 3 is a function block diagram of the user terminal, the personal data management server, and the service providing apparatus.

Referring to FIG. 3, when the location information transmission unit 72 requests the service providing apparatus 10 to provide information relevant to a current location, the location information transmission unit 72 transmits information on the current location acquired by the location detection device 189 to the personal data management server 20.

The service information reception unit 74 receives all or part of information having been transmitted from the service providing apparatus 10 to the personal data management server 20, from the personal data management server 20. The information received by the service information reception unit 74 is information relevant to a current location of the user terminal 70, and is provided to the user by being displayed on the display unit 193 illustrated in FIG. 2A, for example.

Referring back to FIG. 1, the personal data management server 20 receives information on a current location of the user terminal 70, and a request for information relevant to the current location, from the user terminal 70. The personal data management server 20 forms abstracted information from the information on the current location of the user terminal 70, and transmits the abstracted information of the current location and the request to the service providing apparatus 10. In this case, the personal data management server 20 may transmit the abstracted information of the current location to which dummy information is added to the service providing apparatus 10 in some cases, for reducing the invasion of privacy of the user who uses the user terminal 70.

Moreover, when information corresponding to the request is transmitted to the personal data management server 20 from the service providing apparatus 10, the personal data management server 20 transmits all or part of the received information to the user terminal 70. Note that, details of the hardware configuration and the functions of the personal data management server 20 are described later.

Figure 2B:
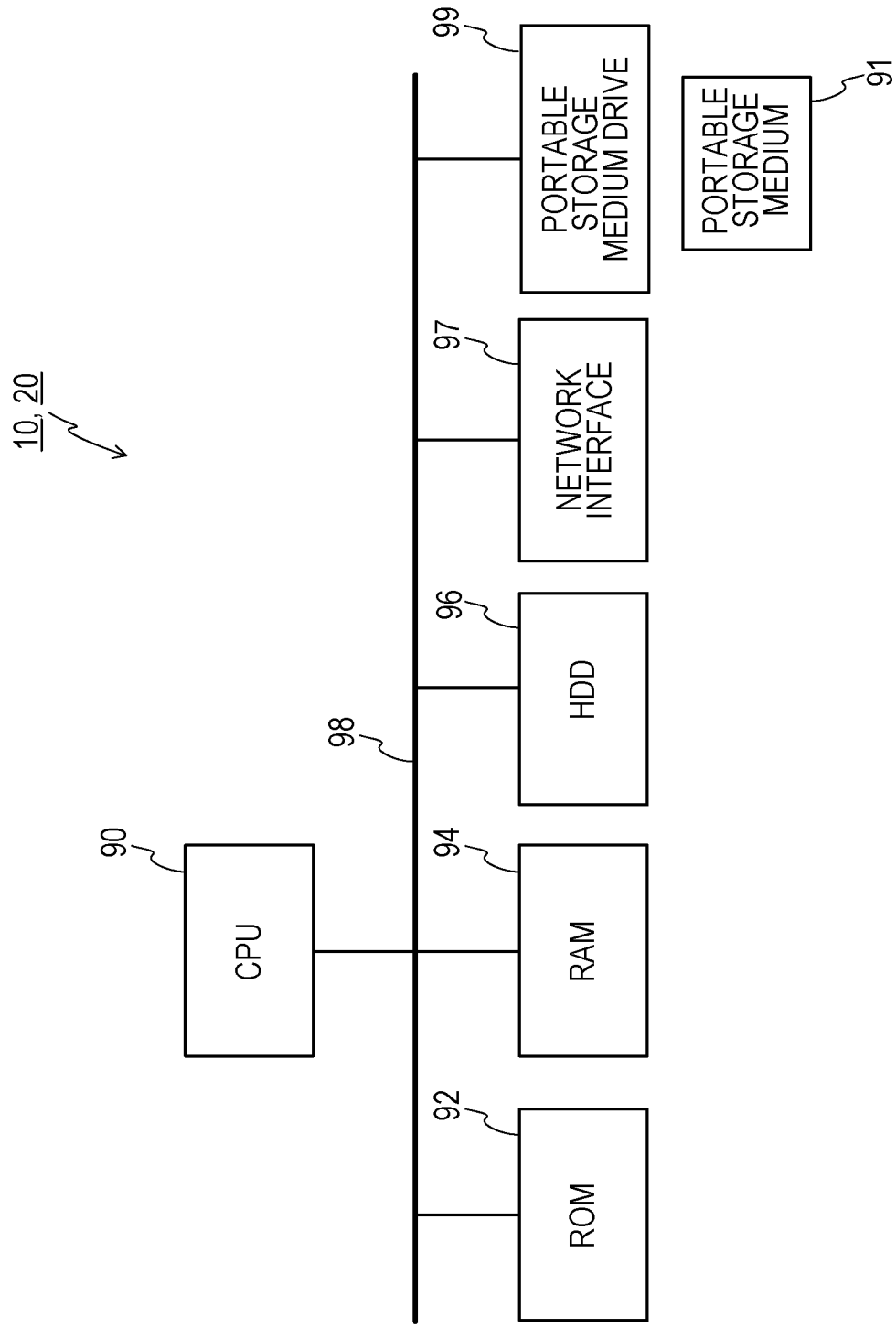
FIG. 2B is a diagram illustrating a hardware configuration of a service providing apparatus and a personal data management server.

The service providing apparatus 10 receives a request from the personal data management server 20, extracts information to be provided to the user terminal 70 based on the received request, and transmits the information to the personal data management server 20. FIG. 2B illustrates a hardware configuration of the service providing apparatus 10. As illustrated in FIG. 2B, the service providing apparatus 10 is provided with a CPU 90, a ROM 92, a RAM 94, a storage unit (herein, HDD) 96, a network interface 97, a portable storage medium drive 99, and the like. These respective constituent units of the service providing apparatus 10 are coupled to a bus 98. In the service providing apparatus 10, the CPU 90 executes a program stored in the ROM 92 or the HDD 96 or a program read from a portable storage medium 91 by the portable storage medium drive 99, thereby implementing functions as a request reception unit 12, a processor 14, and a service information transmission unit 16 illustrated in FIG. 3. Note that, the functions of the respective units in the service providing apparatus 10 in FIG. 3 may be implemented, for example, by an integrated circuit such as an ASIC or an FPGA.

Referring to FIG. 3, the request reception unit 12 receives a request (including abstracted information of the current location of the user terminal 70 or dummy information) that is transmitted from the personal data management server 20. The request reception unit 12 transfers the received request to the processor 14.

When the processor 14 receives the request, the processor 14 extracts information to be provided to the user terminal 70 based on the received request, and transfers the information to the service information transmission unit 16.

The service information transmission unit 16 transmits the information received from the processor 14 to the personal data management server 20.

(Hardware Configuration and Function of Personal Data Management Server 20)

The personal data management server 20 has a hardware configuration as illustrated in FIG. 2B, similar to the service providing apparatus 10. Specifically, the personal data management server 20 is provided with a CPU 90, a ROM 92, a RAM 94, a storage unit (HDD) 96, a network interface 97, a portable storage medium drive 99, and the like. In the personal data management server 20, the CPU 90 executes a program (including a privacy protection program) stored in the ROM 92 or HDD 96 or a program (including a privacy protection program) read from the portable storage medium 91 by the portable storage medium drive 99, thereby implementing the functions of the respective units in FIG. 3. Note that, the functions of the respective units in the personal data management server 20 in FIG. 3 may be implemented, for example, by an integrated circuit such as an ASIC or an FPGA.

The personal data management server 20 functions, by the CPU 90 executing the program, as a location information acquisition unit 22, an abstraction unit 24, a privacy invasion determination unit 26 as an identification unit and a determination unit, a dummy region generation unit 28, a region integration unit 30, a request transmission unit 32, a service information reception unit 34 as a reception unit, and a service information selection unit 36 as a selection unit, which are illustrated in FIG. 3.

The location information acquisition unit 22 acquires information on a current location of the user terminal 70 that is transmitted from the location information transmission unit 72 of the user terminal 70, and transfers the information to the abstraction unit 24.

The abstraction unit 24 forms abstracted information of the received location information of the user terminal 70 based on a privacy protection condition 40. Herein, it is assumed that the privacy protection condition 40 is data as illustrated in FIG. 4, as one example. In the privacy protection condition 40 of FIG. 4, a privacy protection condition for abstraction and a privacy protection condition for invasion determination are defined for every user (for every user ID). Note that, each user sets in advance the privacy protection condition 40.

For example, in the example of FIG. 4, in a case of a user ID=A, the abstraction unit 24 forms abstracted information by converting the received information on the current location of the user terminal 70 into a city name including the current location. Moreover, in a case of a user ID=B, the abstraction unit 24 forms abstracted information by converting the received location information on the user terminal 70 into a prefecture name including the location information. Moreover, in a case of a user ID=C, the abstraction unit 24 forms abstracted information by converting the received location information on the user terminal 70 into a block name including the location information. Note that, the abstracted information of the current location indicates a region where the user is present, so that the abstracted region of the current location is referred to as "presence region" below. The privacy protection condition for invasion determination is used in the privacy invasion determination unit 26, and thus is described in details later.

Referring again to FIG. 3, when information on a presence region of the user terminal 70 is transmitted to the service providing apparatus 10, the privacy invasion determination unit 26 determines whether the privacy is invaded. Herein, even if abstracted information of a current location (information on a presence region) is transmitted at an individual time point, analyzing presence regions at a plurality of time points in combination may identify a narrow range that the user does not want someone to know as a range (presence possible range) where the user is present or was present in some cases. The "range that the user does not want someone to know" in this case is the "privacy protection condition for invasion determination" of the privacy protection condition 40 in FIG. 4. In other words, the privacy protection condition for invasion determination is a preset condition for a presence possible range that the user does not want a third party to know. For example, in a case of the user ID=A in FIG. 4, it is determined that the privacy is invaded unless a presence possible range that is identified when presence region information at a plurality of time points is analyzed in combination is 70% or more of the presence region. Moreover, in a case of the user ID=B, it is determined that the privacy is invaded unless a presence possible range that is identified when presence region information at a plurality of time points is analyzed in combination has an area of 30 km$^2$ or more. Note that, specific processing of the privacy invasion determination unit 26 is described later.

When the privacy invasion determination unit 26 determines that the privacy of the user is invaded, the dummy region generation unit 28 generates dummy information to be transmitted to the service providing apparatus 10 together with the information on a presence region of the user terminal 70. The dummy information is information on a different region (dummy region) in the vicinity of the presence region. For example, when the presence region is an A block, a block that is present in the vicinity of the A block becomes a dummy region.

The region integration unit 30 integrates information on a presence region converted by the abstraction unit 24 with information on a dummy region generated by the dummy region generation unit 28, and transfers the integrated information to the request transmission unit 32. Note that, when the privacy invasion determination unit 26 determines that no privacy is invaded, the abstraction unit 24 directly transfers information on a presence region of the user terminal 70 to the request transmission unit 32.

The request transmission unit 32 transmits a request from the user terminal 70, together with information on a region received from the region integration unit 30 or the abstraction unit 24, to the request reception unit 12 of the service providing apparatus 10. Note that, the request transmission unit 32 stores the content of the request in a request-posted region information log 42. The request-posted region information log 42 has a data structure as illustrated in FIG. 5A, as one example. The request-posted region information log 42 in FIG. 5A is prepared for every user terminal 70 (for every user ID).

Figure 5B:
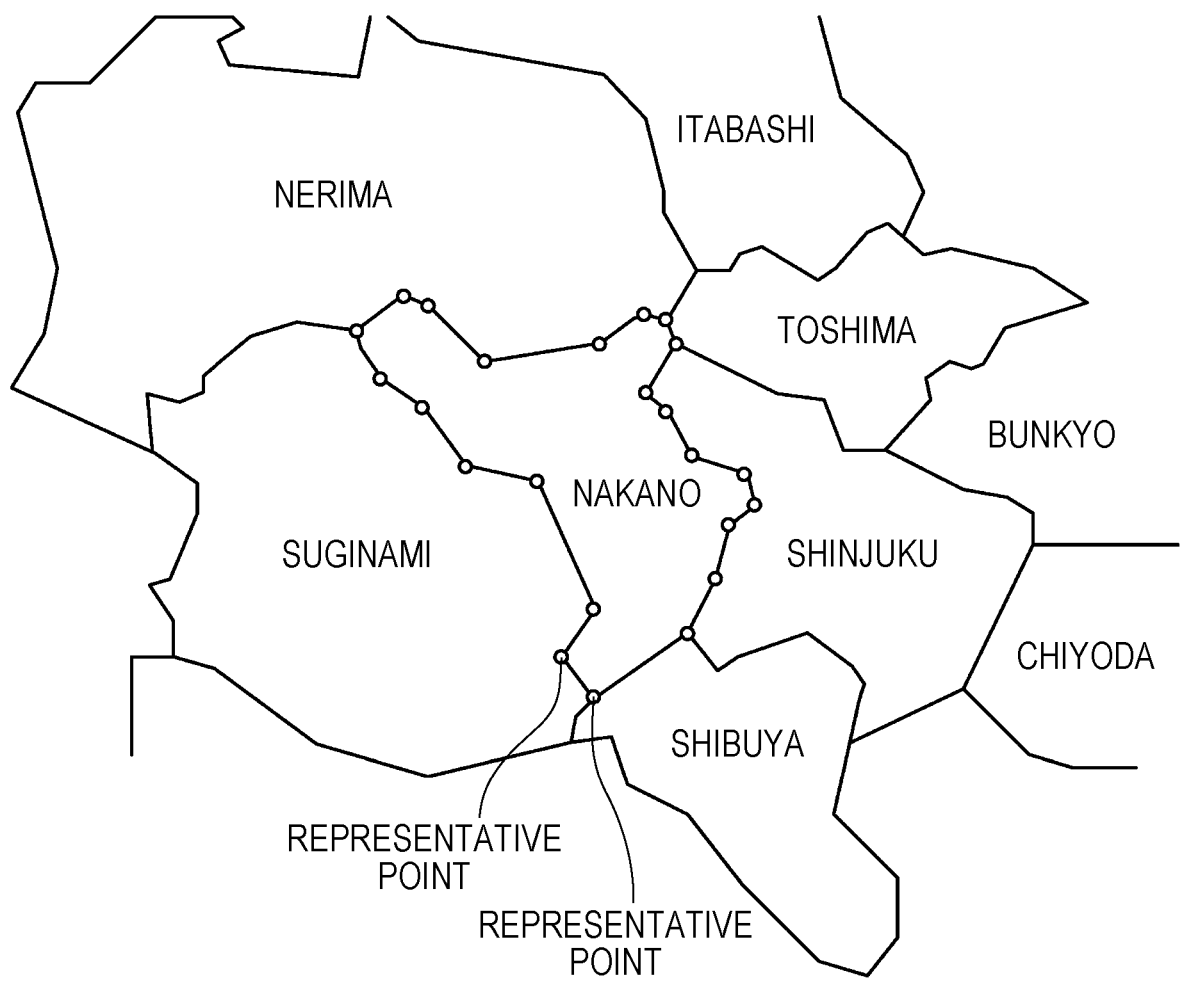
FIG. 5B is a diagram for explaining representative points of a presence possible range.

As illustrated in FIG. 5A, the request-posted region information log 42 stores therein information including "date/time", "presence region information", "dummy region information", and "presence possible range". In the column of "date/time", information on date/time when the request is received from the user terminal 70 is stored. In the column of "presence region information", information on a presence region (for example, city name where the user terminal 70 is present) abstracted from a current location of the user terminal 70 is stored. In the column of "dummy region information", information on a dummy region (for example, a city name in the vicinity of the city where the user terminal 70 is present) having been transmitted to the service providing apparatus 10 is stored. In the column of "presence possible range", information on a presence possible range of the user terminal 70 that can be identified by the service providing apparatus 10 is stored. Specifically, information on the latitudes and the longitudes of a plurality of representative points for defining a presence possible range is stored in the column of "presence possible range". In the example of FIG. 5A, the presence possible range is the entire Nakano-city in Tokyo metropolis, so that representative points are a plurality of points, each of which is indicated by a white circle and is located in a boundary between Nakano-city and a different city (for example, a point at which the direction of a boundary line is changed at a predetermined angle or more) as illustrated in FIG. 5B. Note that, FIG. 5B merely illustrates one example of the representative points, and the number and the locations of actual representative points are different from those in FIG. 5B.

When the service information reception unit 34 receives information from the service information transmission unit 16 of the service providing apparatus 10, the service information reception unit 34 transfers the received information to the service information selection unit 36.

The service information selection unit 36 selects (extracts), out of the information received by the service information reception unit 34, information relevant to a presence region of the user terminal 70, and transmits the selected (extracted) information to the service information reception unit 74 of the user terminal 70. The service information selection unit 36 refers to the column of presence region information of the request-posted region information log 42 when selecting (extracting) information.

(Processing in Personal Data Management Server 20)

Figure 7:
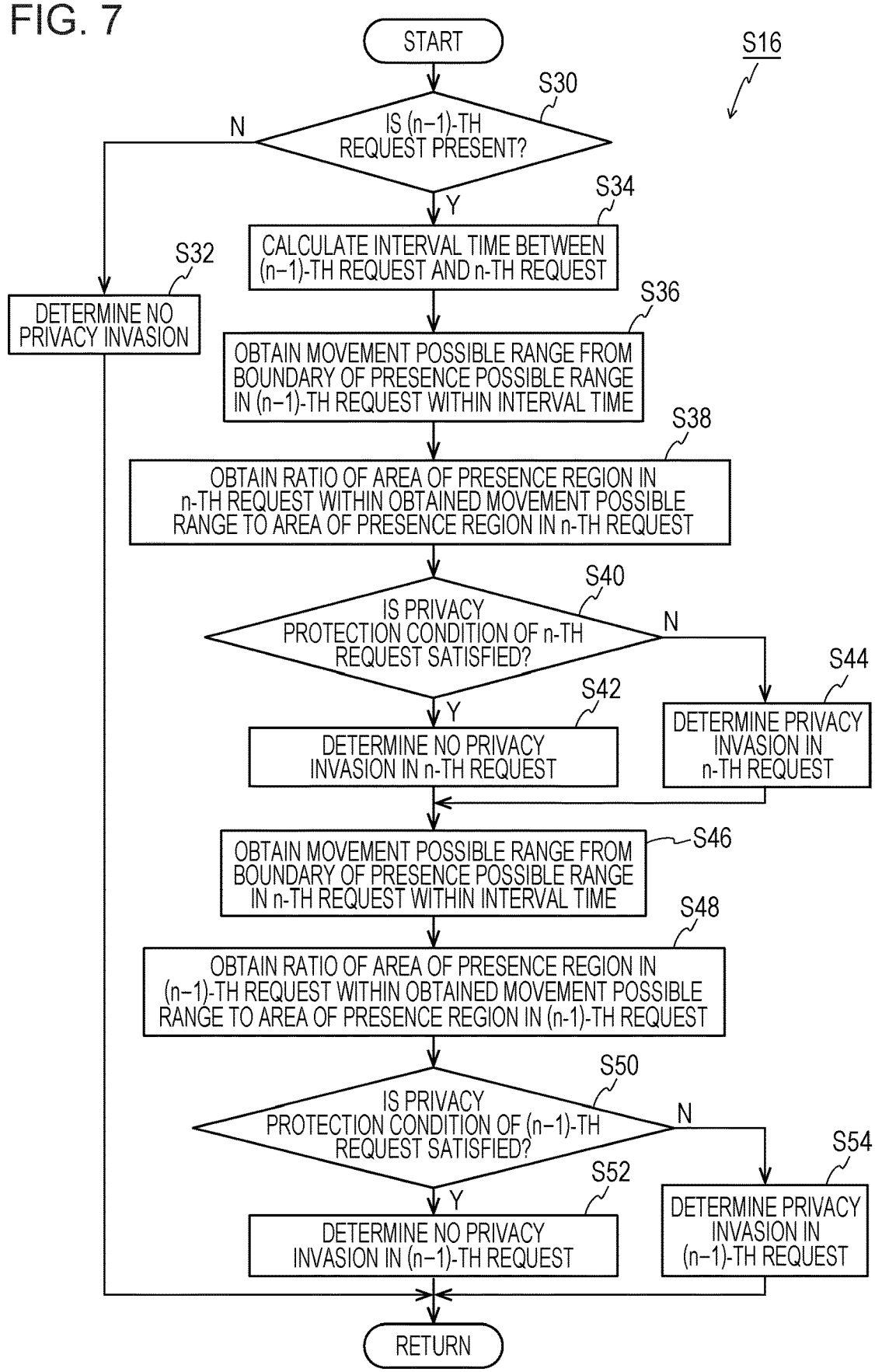
FIG. 7 is a flowchart illustrating a detailed process at step S16 in FIG. 6.
Figure 8:
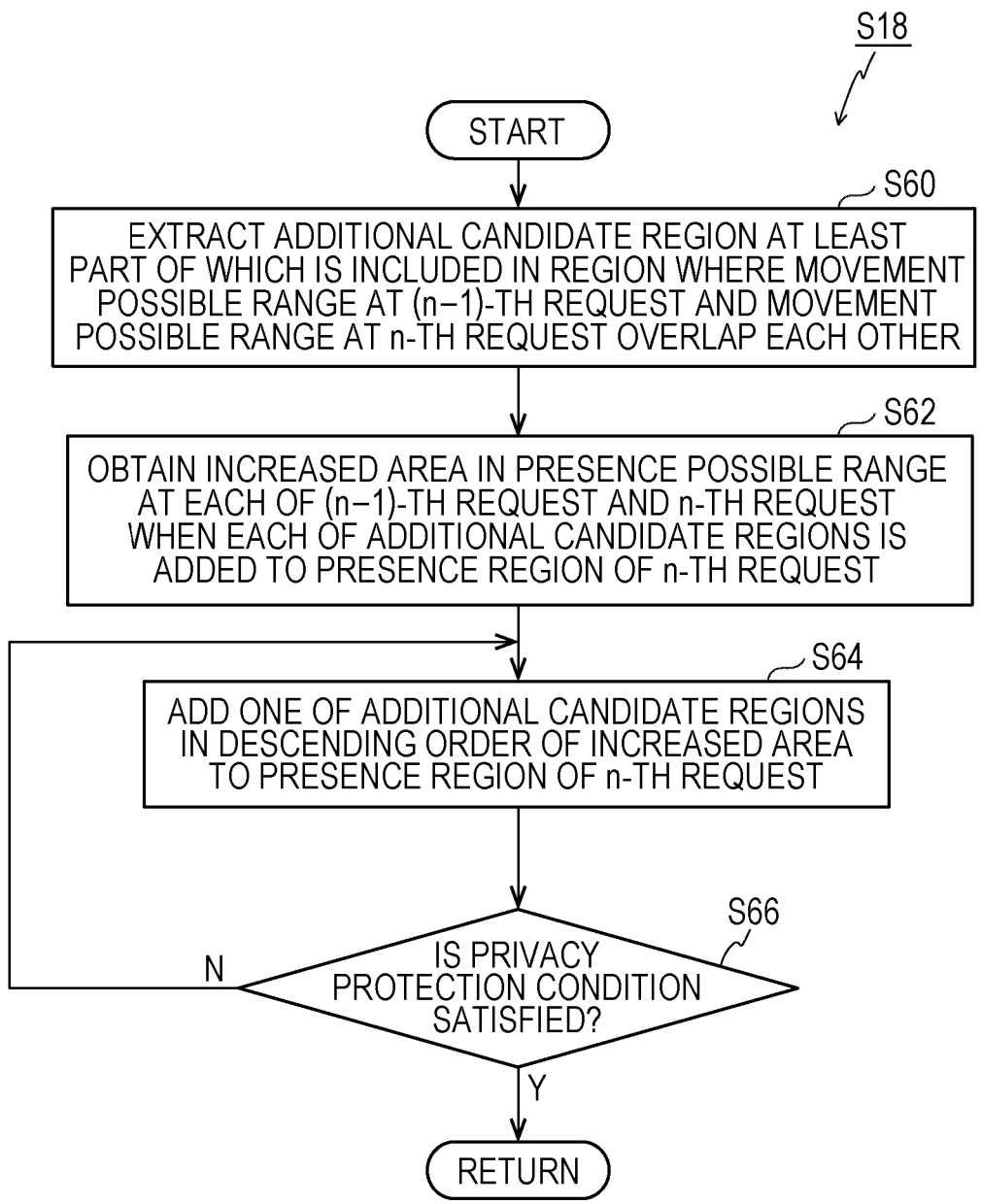
FIG. 8 is a flowchart illustrating a detailed process at step S18 in FIG. 6.

Next, processing in the personal data management server 20 is described in detail along flowcharts of FIGS. 6 to 8 while referring to other drawings as appropriate. Note that, as the precondition of the description, it is assumed that a user having the user ID=A in FIG. 4 uses the user terminal 70. Moreover, no log data on the user terminal 70 having the user ID=A is present in the request-posted region information log 42.

FIG. 6 is a flowchart illustrating overall processing of the personal data management server 20. In the processing of FIG. 6, at step S10, the location information acquisition unit 22 waits until a request is generated. When current location information and a request are transmitted from the location information transmission unit 72 of the user terminal 70, the processing is shifted to step S12, the location information transmission unit 72 receives and transmits the current location information and the request to the abstraction unit 24.

At step S14, the abstraction unit 24 generates presence region information abstracted from the current location information. In this case, the abstraction unit 24 obtains a privacy protection condition for abstraction "city" of the user having the user ID=A from the privacy protection condition 40 of FIG. 4 to generate the abstracted information from the current location information on the user terminal 70. For example, when the user terminal 70 is present within Nakano-city, the presence region is "Nakano-city".

At step S16, the privacy invasion determination unit 26 executes privacy invasion determination processing. At step S16, processing along a flowchart in FIG. 7 is executed. Note that, in the processing of FIG. 7, this time request is an n-th request.

In the processing of FIG. 7, at step S30, the privacy invasion determination unit 26 determines whether information relevant to an (n−1)-th request is stored in the request-posted region information log 42. Note that, as described above, a log of the user ID=A is not present in the request-posted region information log 42, so that the determination at step S30 is negative. If the determination at step S30 is negative, the privacy invasion determination unit 26 determines "no privacy is invaded" at step S32, the entire processing in FIG. 7 is ended, and the processing is shifted to step S17 in FIG. 6.

When the processing is shifted to step S17 in FIG. 6, the privacy invasion determination unit 26 determines whether privacy invasion has been determined. If the determination at step S17 is negative, the processing is shifted to step S22.

When the processing is shifted to step S22, the request transmission unit 32 transmits a request to the service providing apparatus 10 (the request reception unit 12). In this process, the request transmission unit 32 transmits information on a presence region (Nakano-city) together with the request.

At step S24, the request transmission unit 32 updates the request-posted region information log 42. In the case of this example, as in FIG. 5A, "Nakano-city" is stored in the column of presence region information, while the column of dummy region information is a blank column. Moreover, information on the latitudes and the longitudes of representative points (points indicated by white circles) on the boundary of Nakano-city illustrated in FIG. 5B is stored in the column of presence possible range.

When the processing is shifted to step S26, the service information reception unit 34 receives service information (herein, information relevant to a presence region (Nakano-city)) transmitted from the service providing apparatus 10.

At step S28, the service information selection unit 36 refers to the request-posted region information log 42 to select information to be provided to the user terminal 70 among the received service information, and transmits the selected information to the user terminal 70 (the service information reception unit 74). Note that, when the presence region of the user terminal 70 is Nakano-city, and the service information reception unit 34 only receives information relevant to the presence region (Nakano-city) as service information, the service information selection unit 36 transmits all the received information to the user terminal 70. Thereafter, the processing is returned to step S10.

Described is a case where in a status of a log as illustrated in FIG. 9A being stored in the request-posted region information log 42, a request is generated at 14:00:00 on 25 Oct. 2017 from the user terminal 70. A current location of the user terminal 70 at 14:00:00 is within Setagaya-city. Note that, in the column of "presence possible range" in the log data of FIG. 9A, information on the latitudes and the longitudes of representative points that define the entire region of Shibuya-city is stored.

When a request is generated from the user terminal 70, the determination at step S10 in FIG. 6 is affirmative, and the processing is shifted to step S12. When the processing is shifted to step S12, the location information transmission unit 72 receives and transmits current location information and the request to the abstraction unit 24. At step S14, the abstraction unit 24 forms abstracted information on a presence region from the current location information. In this case, the presence region is "Setagaya-city".

At step S16, the privacy invasion determination processing in FIG. 7 is executed. In the processing of FIG. 7, at step S30, the privacy invasion determination unit 26 determines whether an (n−1)-th request is present in the request-posted region information log 42. Herein, as illustrated in FIG. 9A, information on the request ((n−1)-th request) having been obtained immediately before is stored in the request-posted region information log 42, so that the determination at step S30 is affirmative, and the processing is shifted to step S34.

When the processing is shifted to step S34, the privacy invasion determination unit 26 calculates interval time between the (n−1)-th request and an n-th request. In this example, the interval time is calculated as 30 minutes.

At step S36, the privacy invasion determination unit 26 obtains a movable range (movement possible range) from the boundary of the presence possible range in the (n−1)-th request within the interval time. In this case, the presence possible range of the (n−1)-th request is the whole region of Shibuya-city, so that a range illustrated by the dashed line in FIG. 10A is identified as a movable range from the boundary of Shibuya-city within the interval time (30 minutes). The movement possible range can be set as a range where points apart from respective points on the boundary by a predetermined distance based on the interval time are connected, for example.

At step S38, the privacy invasion determination unit 26 obtains a ratio of the area of a presence region of the n-th request included in the obtained movement possible range, to the area of the presence region of the n-th request. Specifically, the privacy invasion determination unit 26 obtains a ratio of the area within Setagaya-city (the area of a black painted portion in FIG. 10B) that overlaps the obtained movement possible range (region surrounded by the dashed line), to the area of Setagaya-city.

Figure 10B:
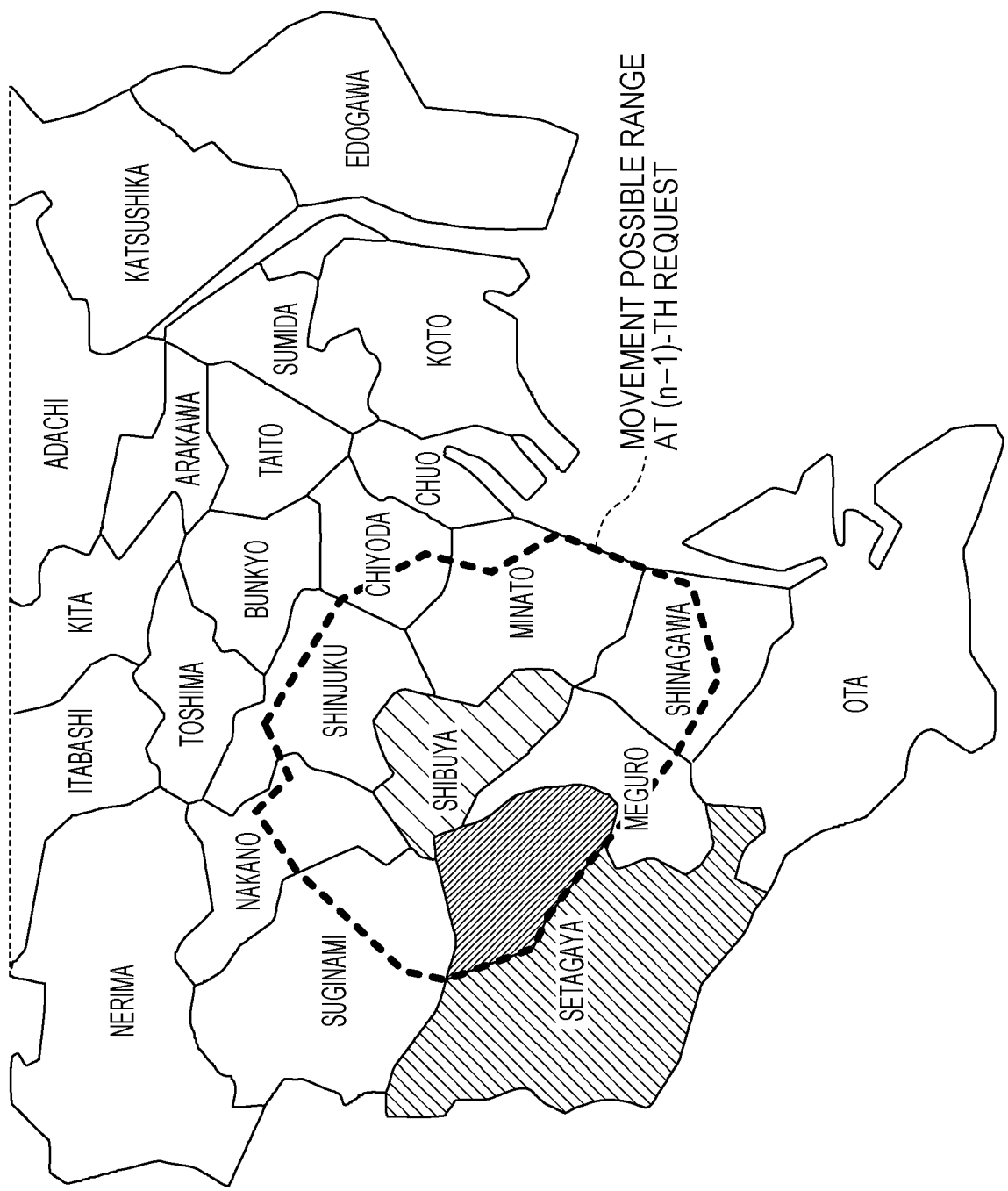

At step S40, the privacy invasion determination unit 26 determines whether a privacy protection condition of the n-th request is satisfied. In this case, the privacy invasion determination unit 26 determines whether the privacy protection condition for invasion determination (ratio being 70% or more) of the user ID=A in FIG. 4 is satisfied. In the example of FIG. 10B, the ratio of the black painted portion to Setagaya-city is not 70% or more of Setagaya-city, so that the determination at step S40 is negative, and the processing is shifted to step S44. At step S44, the privacy invasion determination unit 26 determines that the privacy is invaded in the n-th request. On the other hand, if the determination at step S40 is affirmative, the processing is shifted to step S42, and the privacy invasion determination unit 26 determines that no privacy is invaded in the n-th request. After step S42 or S44, the processing is shifted to step S46.

Figure 11A:
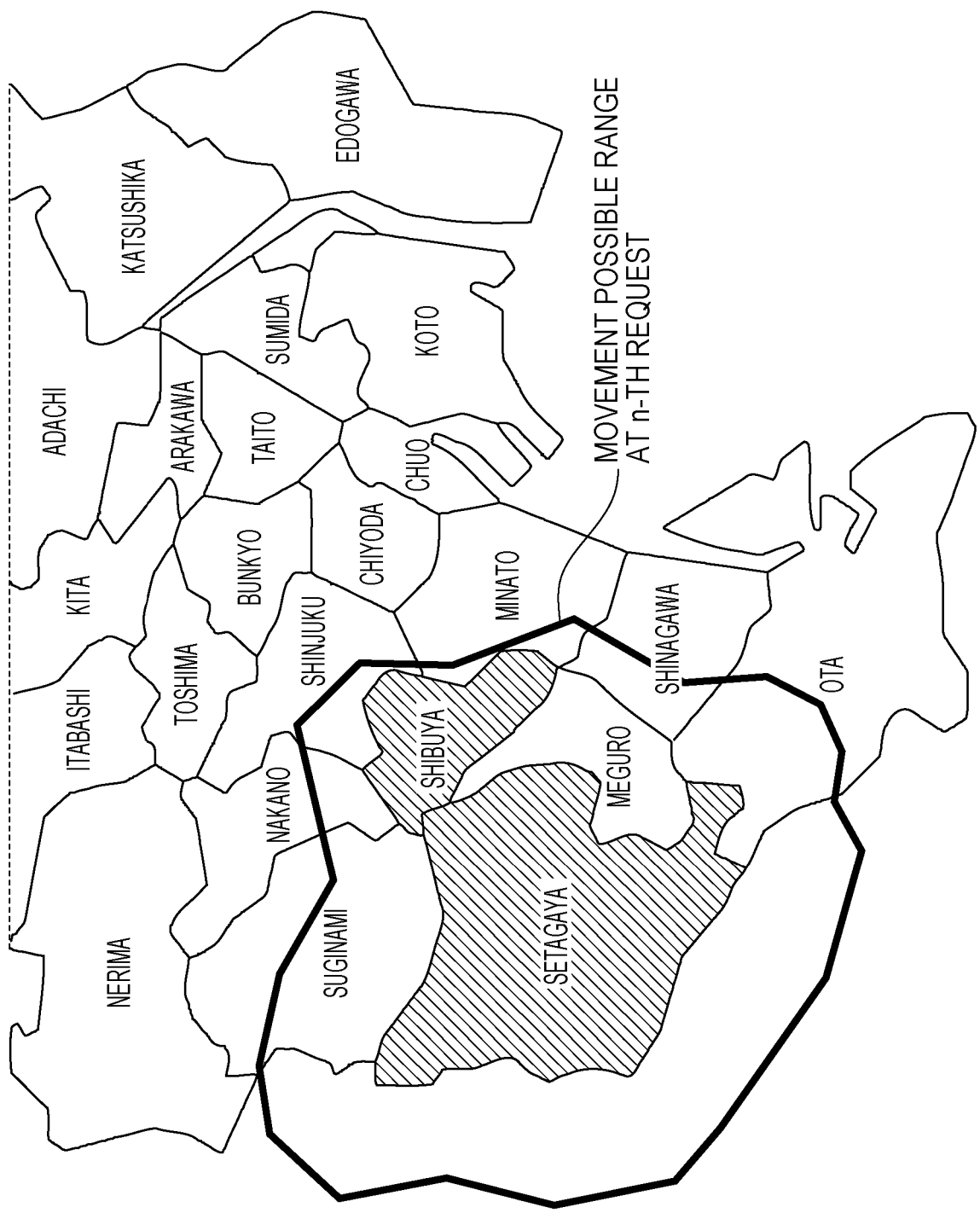
FIGS. 11A and 11B are diagrams (Part 2) for explaining the processes in FIGS. 6 to 8.

When the processing is shifted to step S46, the privacy invasion determination unit 26 obtains a movement possible range from the boundary of the presence possible range in the n-th request within the interval time. In this case, a movement possible range illustrated by the thick solid line in FIG. 11A is identified.

Figure 11B:
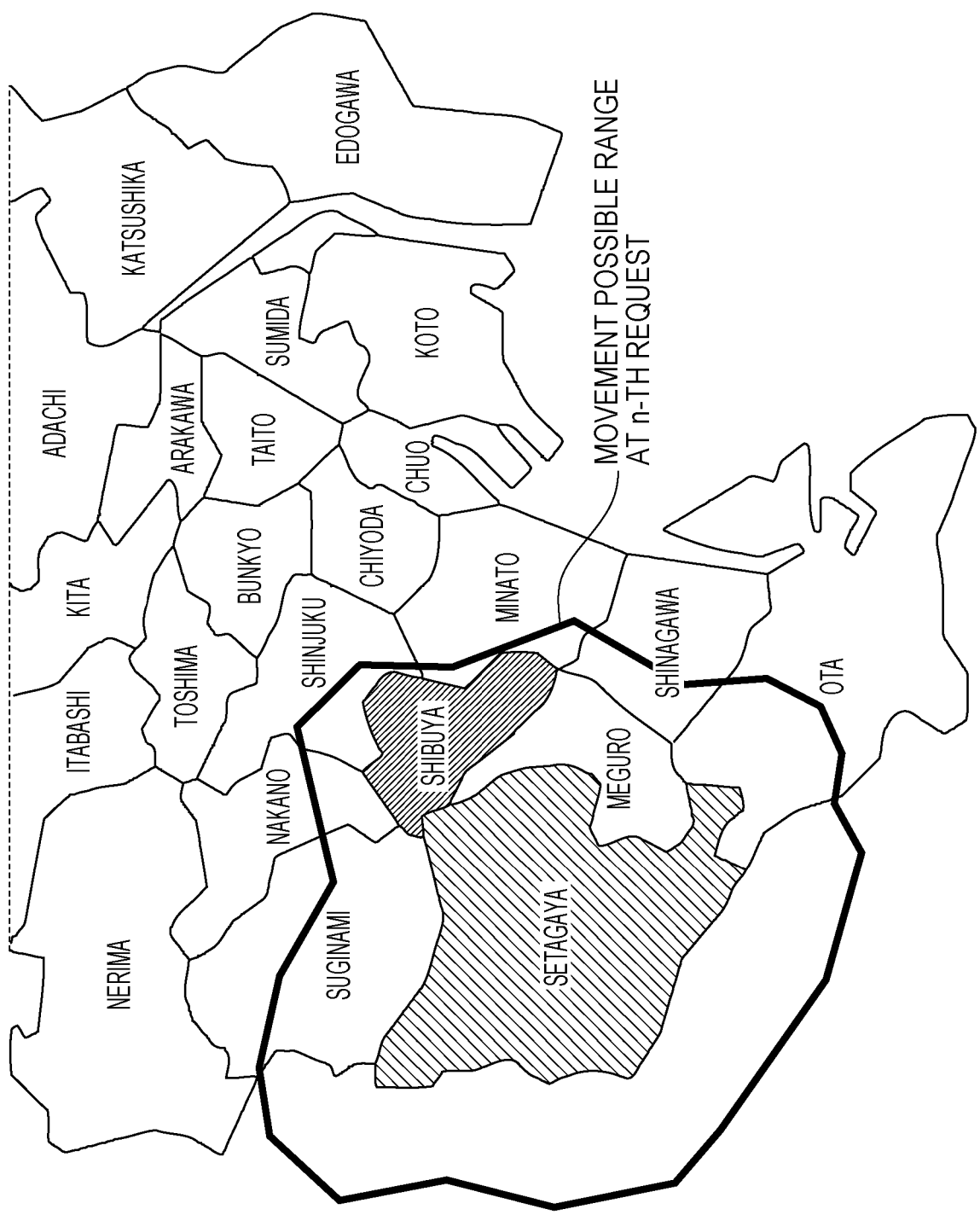

At step S48, the privacy invasion determination unit 26 obtains a ratio of the area of a presence region of the (n−1)-th request included in the obtained movement possible range, to the area of a presence region in the (n−1)-th request. Specifically, the privacy invasion determination unit 26 obtains a ratio of the area within Shibuya-city (the area of a black painted portion in FIG. 11B) that overlaps the obtained movement possible range (region surrounded by the thick solid line), to the area of Shibuya-city. In this case, as illustrated in FIG. 11B, the entire Shibuya-city is included in the movement possible range, so that the ratio of 100% is obtained.

At step S50, the privacy invasion determination unit 26 determines whether a privacy protection condition of the n-th request is satisfied. In this case, the privacy invasion determination unit 26 determines whether the privacy protection condition for invasion determination (ratio being 70% or more) of the user ID=A in FIG. 4 is satisfied. In the example of FIG. 11B, the ratio obtained at step S48 is 70% or more, so that the determination at step S50 is affirmative, and the processing is shifted to step S52.

When the processing is shifted to step S52, the privacy invasion determination unit 26 determines that no privacy is invaded in the n-th request. On the other hand, if the determination at step S50 is negative, and the processing is shifted to step S54, the privacy invasion determination unit 26 determines that the privacy is invaded in the n-th request. After step S52 or S54, the entire processing in FIG. 7 is ended, the processing is shifted to step S17 in FIG. 6. Note that, in the processing in FIG. 7, the processes from steps S36 to S44 and the processes from steps S46 to S54 may be executed with the changed order, or may be concurrently executed.

When the processing is shifted to step S17 in FIG. 6, the privacy invasion determination unit 26 determines whether privacy invasion has been determined. Herein, in the processing in FIG. 7, if the processing has undergone step S44 and/or step S54, the determination at step S17 is affirmative. If the determination at step S17 is affirmative, the processing is shifted to step S18.

When the processing is shifted to step S18, the dummy region generation unit 28 executes dummy region information generation processing. Specifically, the dummy region generation unit 28 executes processing along the flowchart in FIG. 8.

Figure 12:
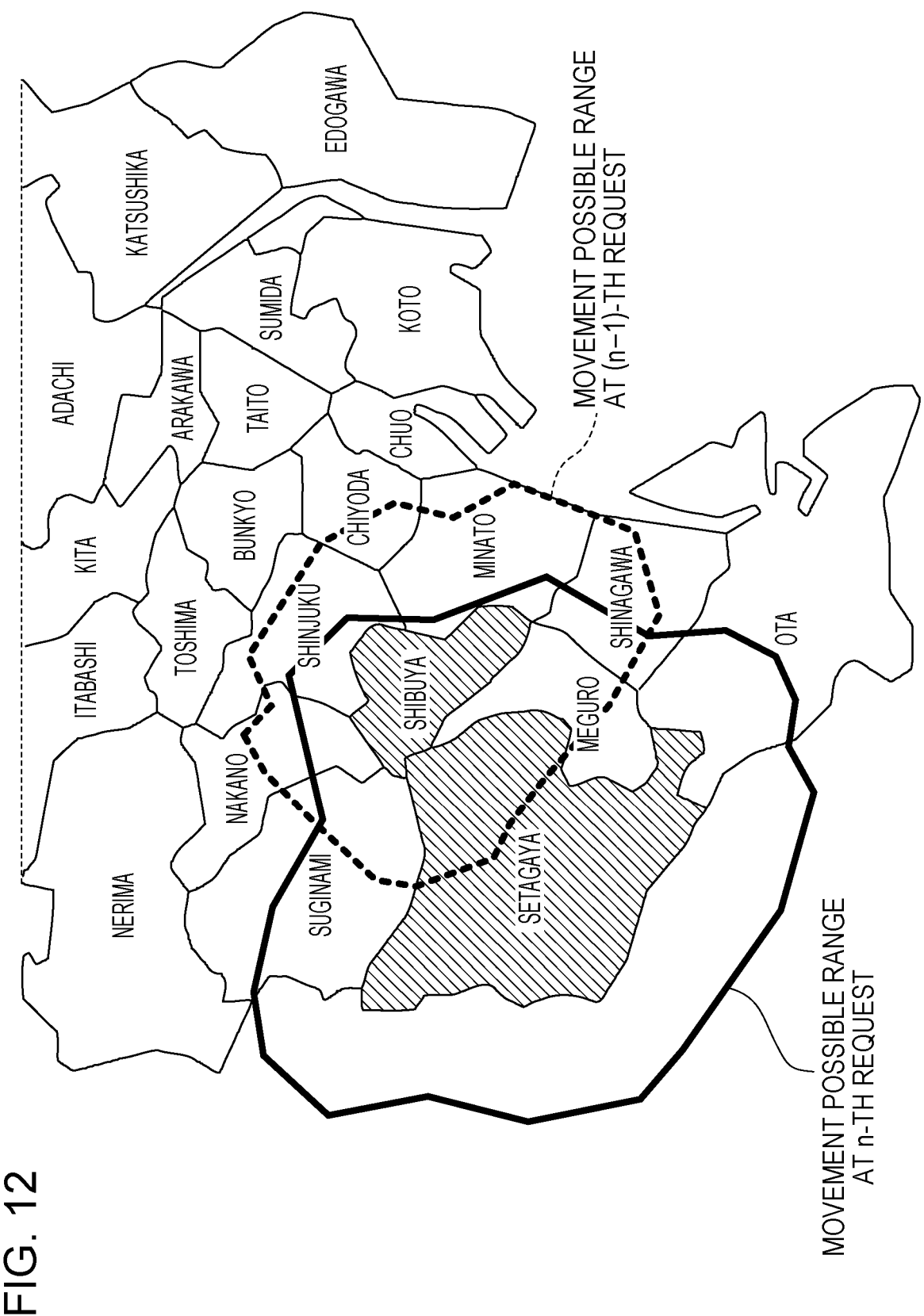
FIG. 12 is a diagram (Part 3) for explaining the processing in FIGS. 6 to 8.

In the processing of FIG. 8, at step S60, the dummy region generation unit 28 extracts a region (city) at least a part of which is included in a region where a movement possible range (region surrounded by the dashed line in FIG. 12) at the (n−1)-th request and a movement possible range (region surrounded by the solid line in FIG. 12) in the n-th request overlap each other, as an additional candidate region. In this case, as illustrated in FIG. 12, "Suginami-city", "Nakano-city", "Meguro-city", "Shinagawa-city", "Minato-city", and "Shinjuku-city", each including at least a part that is included in the overlapping region, are extracted as additional candidate regions.

At step S62, the dummy region generation unit 28 obtains an increased area in the presence possible range between at the (n−1)-th request and at the n-th request when each of all the additional candidate regions is added one after another to the presence region of the n-th request.

Figure 13A:
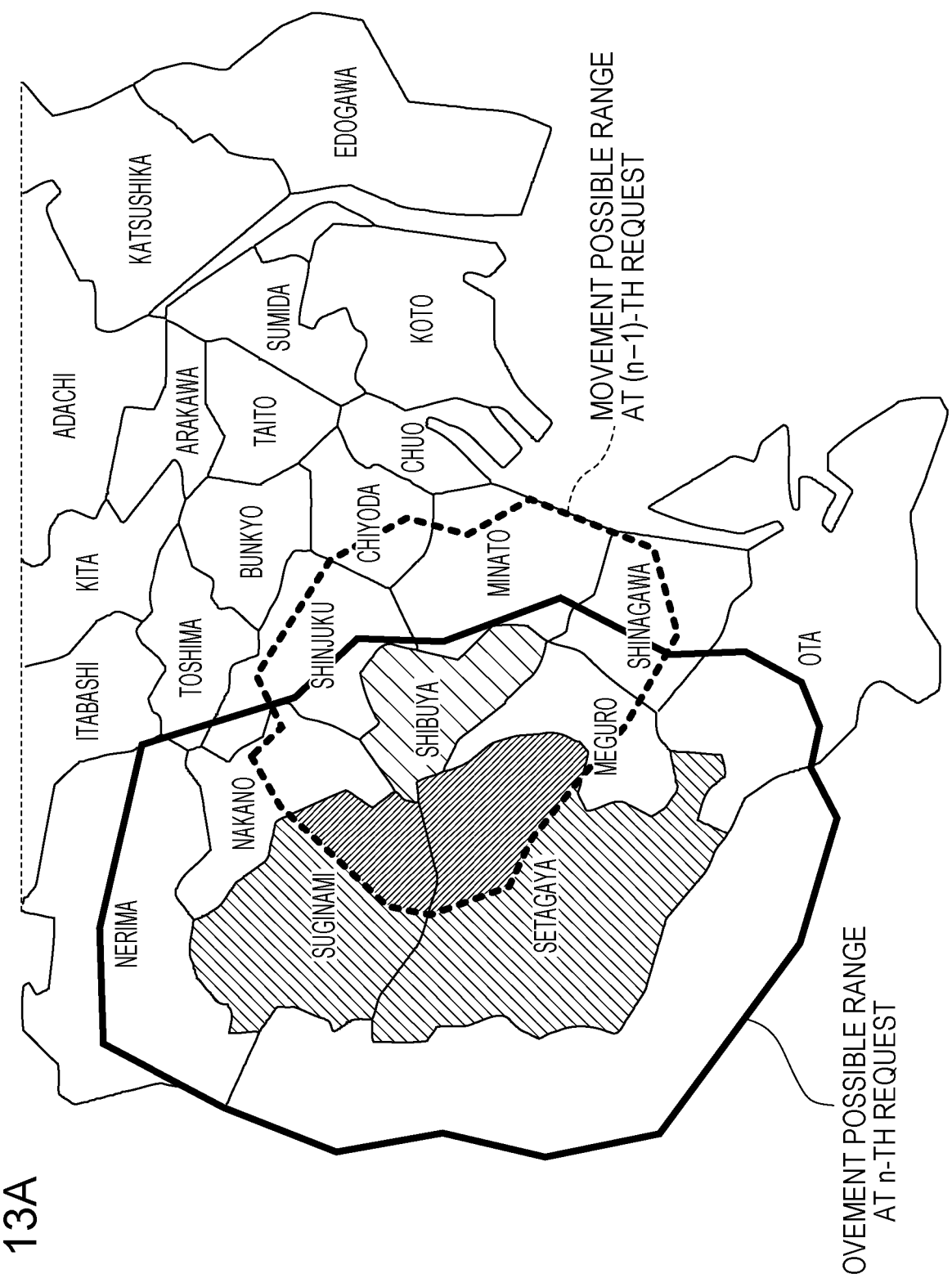

For example, "Suginami-city" that is an additional candidate region is added to a presence region of the n-th request. In this case, as illustrated in FIG. 13A, the presence region of the n-th request includes Setagaya-city and Suginami-city, a movement possible range illustrated by the thick solid line at the n-th request becomes wider than that in FIG. 12. Further, the presence possible range at the n-th request increases by the area of a range illustrated being black painted within Suginami-city. Meanwhile, the increased area of a presence possible range at the (n−1)-th request is 0.

Moreover, for example, "Meguro-city" that is an additional candidate region is added to the presence region of the n-th request. In this case, as illustrated in FIG. 13B, the presence region of the n-th request includes Setagaya-city and Meguro-city, a movement possible range illustrated by the thick solid line at the n-th request becomes wider than that in FIG. 12. Further, the presence possible range at the n-th request increases by the area of a range illustrated being black painted within Meguro-city. Meanwhile, the increased area of a presence possible range at the (n−1)-th request is 0.

The other additional candidate regions are subjected to the similar processing to calculate the increased area. Note that, herein, as one example, the order of "Suginami-city", "Meguro-city", "Shinagawa-city" . . . is a descending order of the increased area.

At step S64, the dummy region generation unit 28 adds one of the additional candidate regions in descending order of the increased area, to the presence region of the n-th request. The dummy region generation unit 28 adds Suginami-city to the presence region (Setagaya-city) of the n-th request. In this case, the presence possible range in the n-th request is a portion illustrated being black painted in FIG. 13A.

At step S66, the dummy region generation unit 28 determines whether a privacy protection condition is satisfied. Herein, the dummy region generation unit 28 determines whether the area of a portion illustrated being black painted in FIG. 13A is 70% or more of the area of the presence region (Setagaya-city) at the n-th request. If the determination at step S66 is negative, the processing is returned to step S64.

At step S64, Meguro-city having the second largest increased area is added to the presence region (herein Setagaya-city and Suginami-city) of the n-th request. In this case, the presence possible range in the n-th request is a portion illustrated being black painted in FIG. 14A. At step S66, the dummy region generation unit 28 determines whether the area of a portion illustrated being black painted in FIG. 14A is 70% or more of that of the presence region (Setagaya-city) at the n-th request. If the determination at step S66 is negative, the processing is again returned to step S64.

Figure 14B:
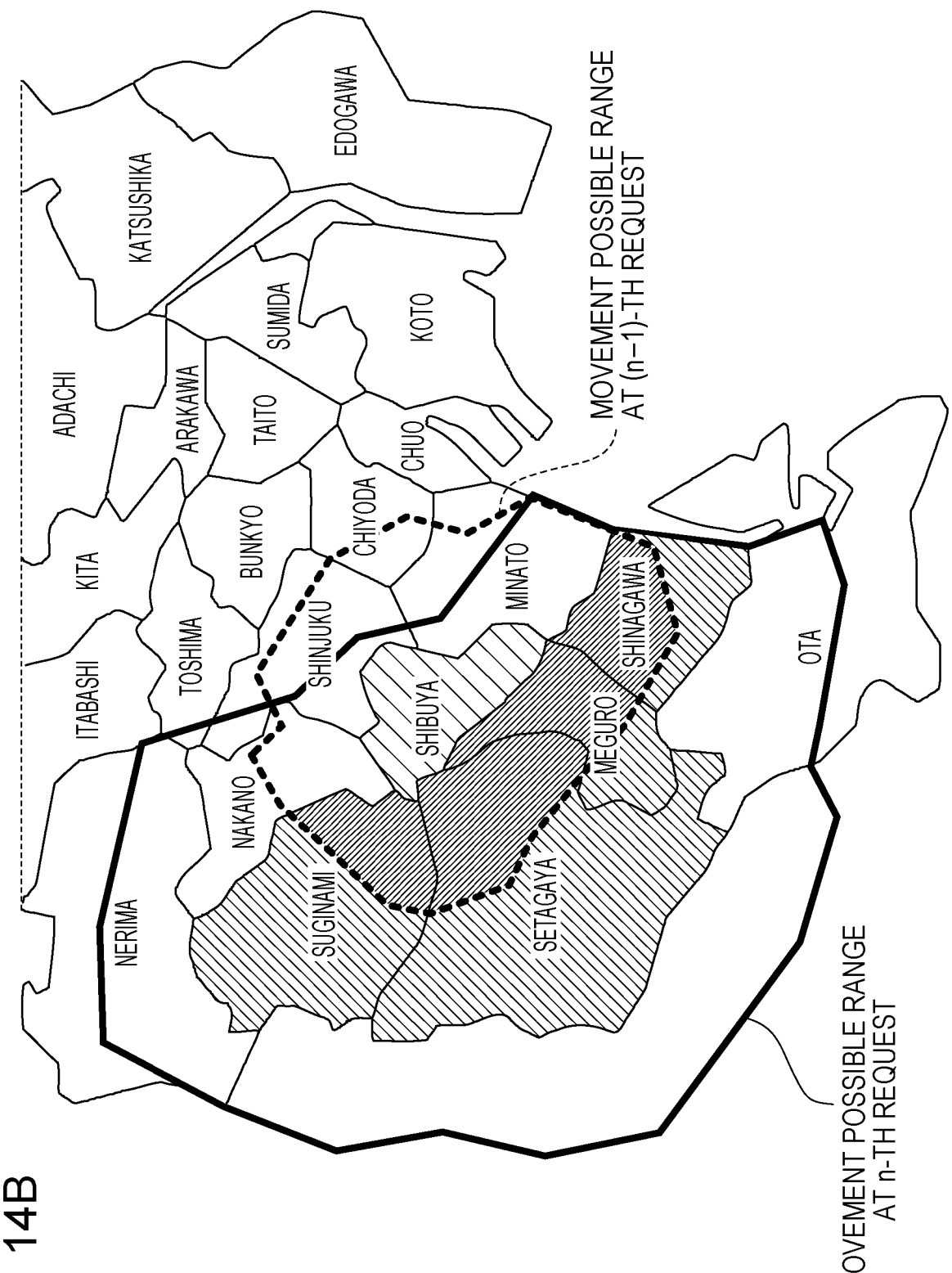

When the processing is returned to step S64, Shinagawa-city having the third largest increased area is added to the presence region (herein Setagaya-city, Suginami-city, and Meguro-city) of the n-th request. In this case, the presence possible range in the n-th request is a portion illustrated being black painted in FIG. 14B. At step S66, the dummy region generation unit 28 determines whether the area of the portion illustrated being black painted in FIG. 14B is 70% or more of the area of the presence region (Setagaya-city) at the n-th request. If the determination herein is affirmative, the entire processing in FIG. 8 is ended, and the processing is shifted to step S20 in FIG. 6. Note that, the additional candidate regions (Suginami-city, Meguro-city, and Shinagawa-city) having been added at step S64 serves as a dummy region, and information on the dummy region is transmitted from the dummy region generation unit 28 to the region integration unit 30.

When the processing is shifted to step S20 in FIG. 6, the region integration unit 30 integrates information on the presence region (Setagaya-city) with information on the dummy region (Suginami-city, Meguro-city, and Shinagawa-city), and transmits the integrated information to the request transmission unit 32.

At step S22, the request transmission unit 32 transmits a request to the service providing apparatus 10 (the request reception unit 12). In this process, the request transmission unit 32 transmits the information on the presence region (Setagaya-city) and the information on the dummy region (Suginami-city, Meguro-city, and Shinagawa-city), together with the request.

At step S24, the request transmission unit 32 updates the request-posted region information log 42. In the case of this example, as in FIG. 9B, "Setagaya-city" is stored in the column of presence region information, and "Suginami-city, Meguro-city, and Shinagawa-city" are stored in the column of dummy region information. Further, information on the latitudes and the longitudes of a plurality of representative points in the black painted portion illustrated in FIG. 14B is stored in the column of presence possible range.

When the processing is shifted to step S26, the service information reception unit 34 receives service information (herein, information relevant to the presence region (Setagaya-city) and information relevant to the dummy region (Suginami-city, Meguro-city, and Shinagawa-city)) transmitted from the service providing apparatus 10.

At step S28, the service information selection unit 36 refers to the request-posted region information log 42 to select information to be provided to the user terminal 70 among the received service information, and transmits the selected information to the user terminal 70 (the service information reception unit 74). Note that, the service information reception unit 34 receives, as service information, information relevant to the presence region (Setagaya-city) and information relevant to the dummy region information (Suginami-city, Meguro-city, and Shinagawa-city). Meanwhile, a current presence region of the user terminal 70 is Setagaya-city, so that the service information selection unit 36 selects (extracts) only the information relevant to the presence region (Setagaya-city) among the received information, and transmits the selected (extracted) information to the user terminal 70. Thereafter, the processing is returned to step S10.

The above-described example from FIGS. 10A to 14B is an example in a case where the privacy is invaded in the n-th request, but no privacy is invaded in the (n−1)-th request. As another example, a case where the privacy is invaded in the (n−1)-th request, but no privacy is invaded in the n-th request is described below.

Figure 15A:
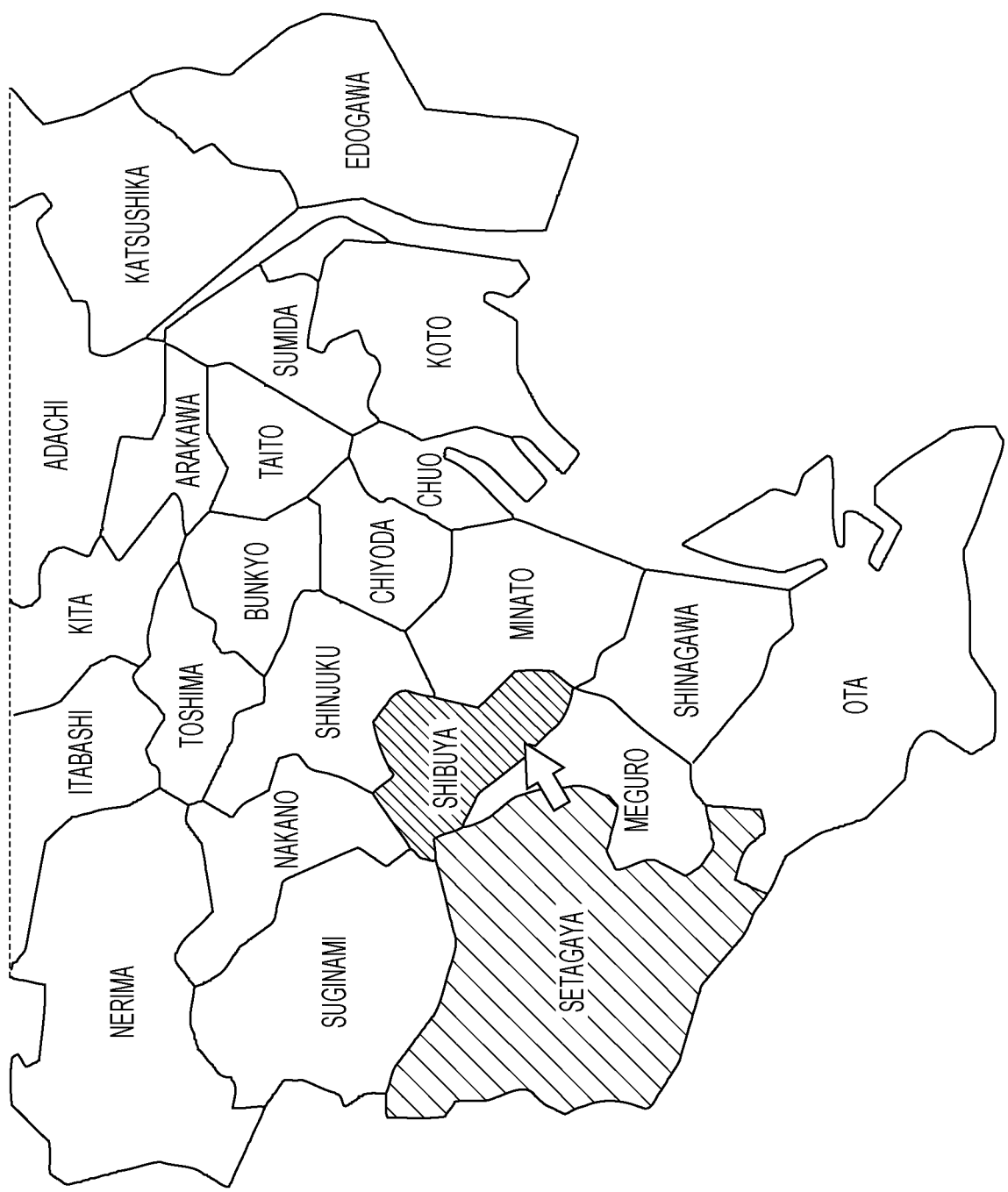
FIGS. 15A and 15B are diagrams (Part 6) for explaining the processing in FIGS. 6 to 8.
Figure 15B:
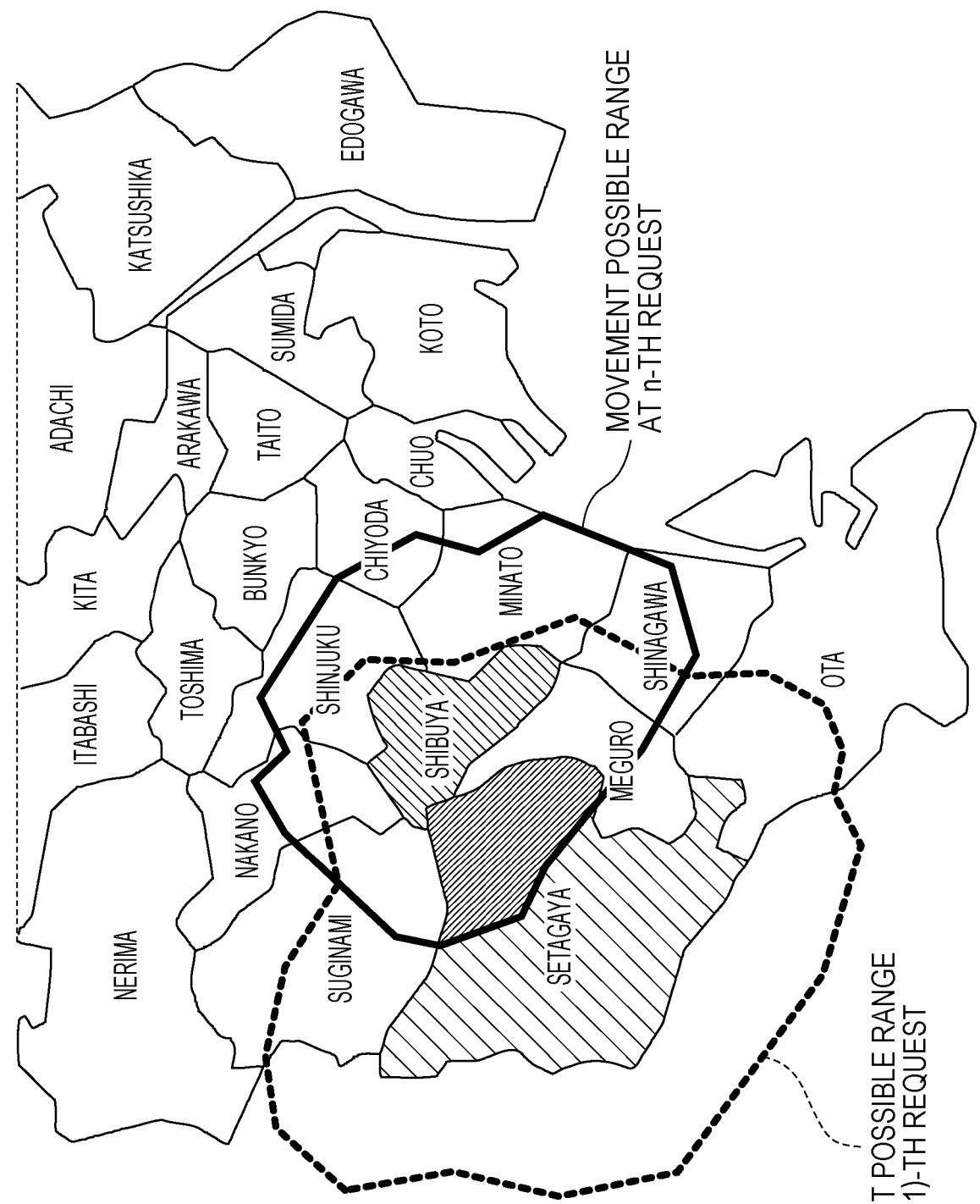

FIG. 15A illustrates a case where the presence region at the (n−1)-th request is Setagaya-city, and the presence region at the n-th request is Shibuya-city. In this case, a range illustrated by the thick solid line is a movement possible range at the n-th request, and a range illustrated by the dashed line is a movement possible range at the (n−1)-th request, in FIG. 15B.

In this example, the ratio of the area (area of a black painted portion in FIG. 15B) of the presence region of the (n−1)-th request included in movement possible range at the n-th request to the area (area of Setagaya-city) of the presence region of the (n−1)-th request is not 70% or more. Accordingly, the privacy is invaded in the (n−1)-th request. Meanwhile, the ratio of the area (area of the entire Shibuya-city) of the presence region of the n-th request included in the movement possible range at the (n−1)-th request to the area (area of Shibuya-city) of the presence region of the n-th request is 100%. Accordingly, no privacy is invaded in the n-th request.

Figure 16A:
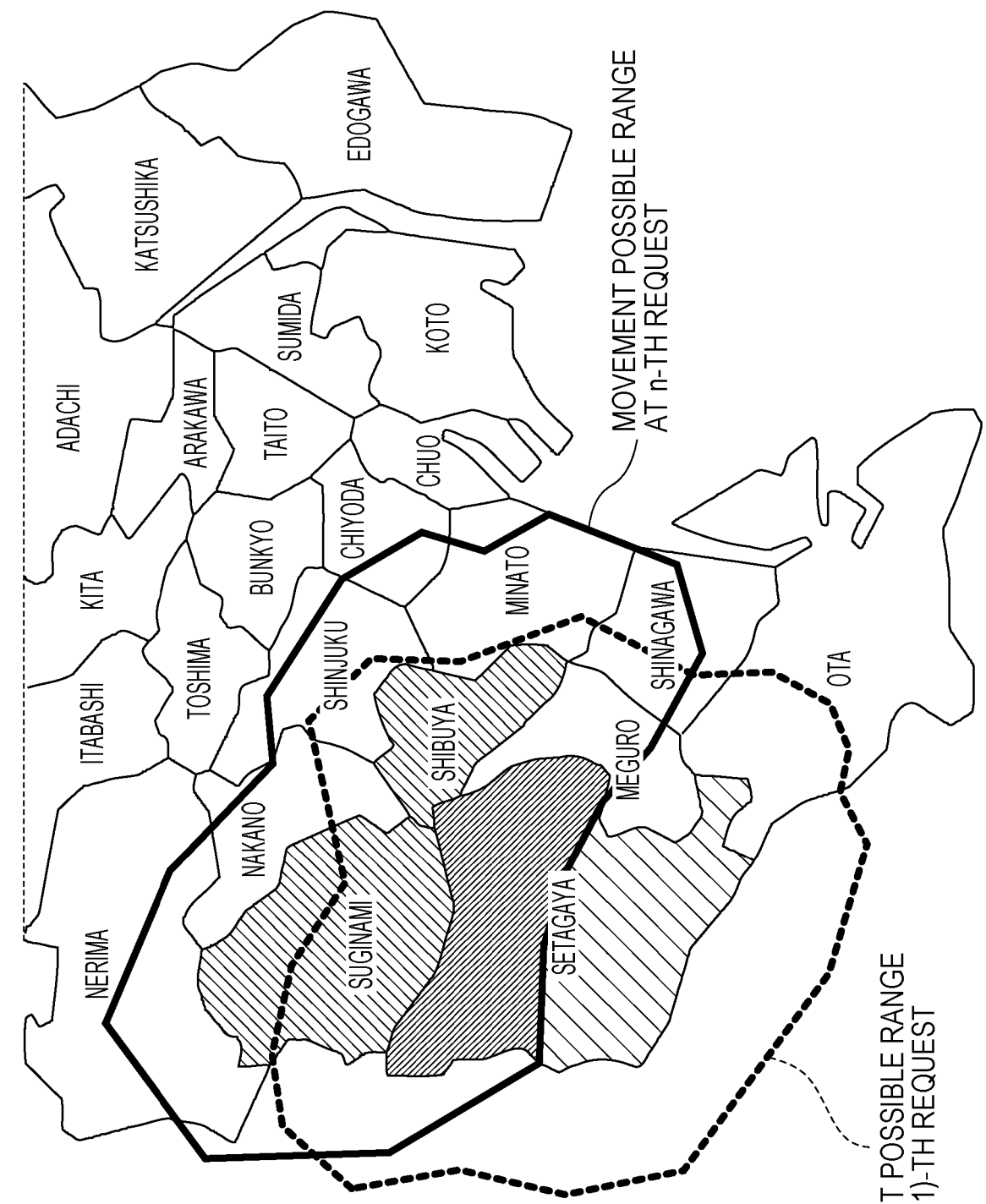
FIGS. 16A and 16B are diagrams (Part 7) for explaining the processing in FIGS. 6 to 8.

In this case, at step S64 in FIG. 8, as illustrated in FIG. 16A, the dummy region generation unit 28 adds Suginami-city to the presence region (Shibuya-city) at the n-th request. With this, the size of the movement possible range (range surrounded by the thick solid line) at the n-th request becomes larger than that in FIG. 15B, so that the presence possible range as illustrated being black painted at the (n−1)-th request becomes larger. Further, at this stage, the area of the presence possible range (black painted range) at the (n−1)-th request does not exceed 70% of the area of the entire Setagaya-city, so that the determination at step S66 is negative, and the processing is returned to step S64.

Figure 16B:
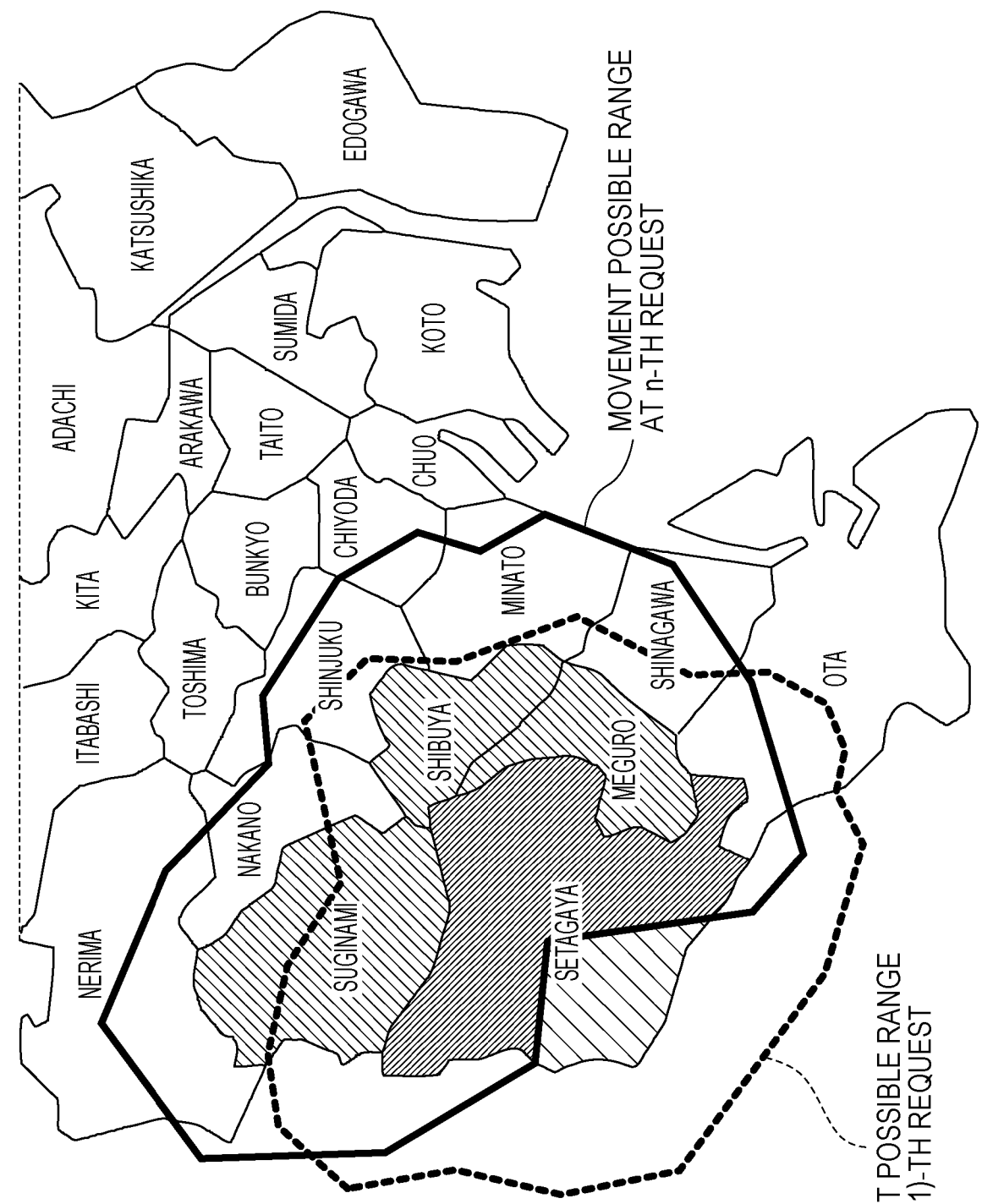

Further, at step S64, as illustrated in FIG. 16B, the dummy region generation unit 28 adds Meguro-city to the presence region (herein, Shibuya-city and Suginami-city) at the n-th request. With this, the size of the movement possible range (range surrounded by the thick solid line) at the n-th request becomes larger than that in FIG. 16A, so that the presence possible range as illustrated being black painted at the (n−1)-th request becomes larger. In this case, if the area of the presence possible range (black painted range) at the (n−1)-th request exceeds 70% of the area of the entire Setagaya-city, the determination at step S66 is affirmative, and the processing is shifted to step S20 in FIG. 6.

When the processing is shifted to step S20, the region integration unit 30 integrates information on the presence region (Sibuya-city) with information on the dummy region (Suginami-city and Meguro-city), and transmits the integrated information to the request transmission unit 32. Thereafter, the processes at from steps S22 to S28 may be executed in a manner similar to those described in the foregoing.

Note that, with the abovementioned processes, the presence possible range at the (n−1)-th request changes, so that the information on a presence possible range of the (n−1)-th request in the request-posted region information log 42 is updated.

Next, an example in a case where the privacy is invaded in both of the (n−1)-th request and the n-th request is described.

Figure 17A:
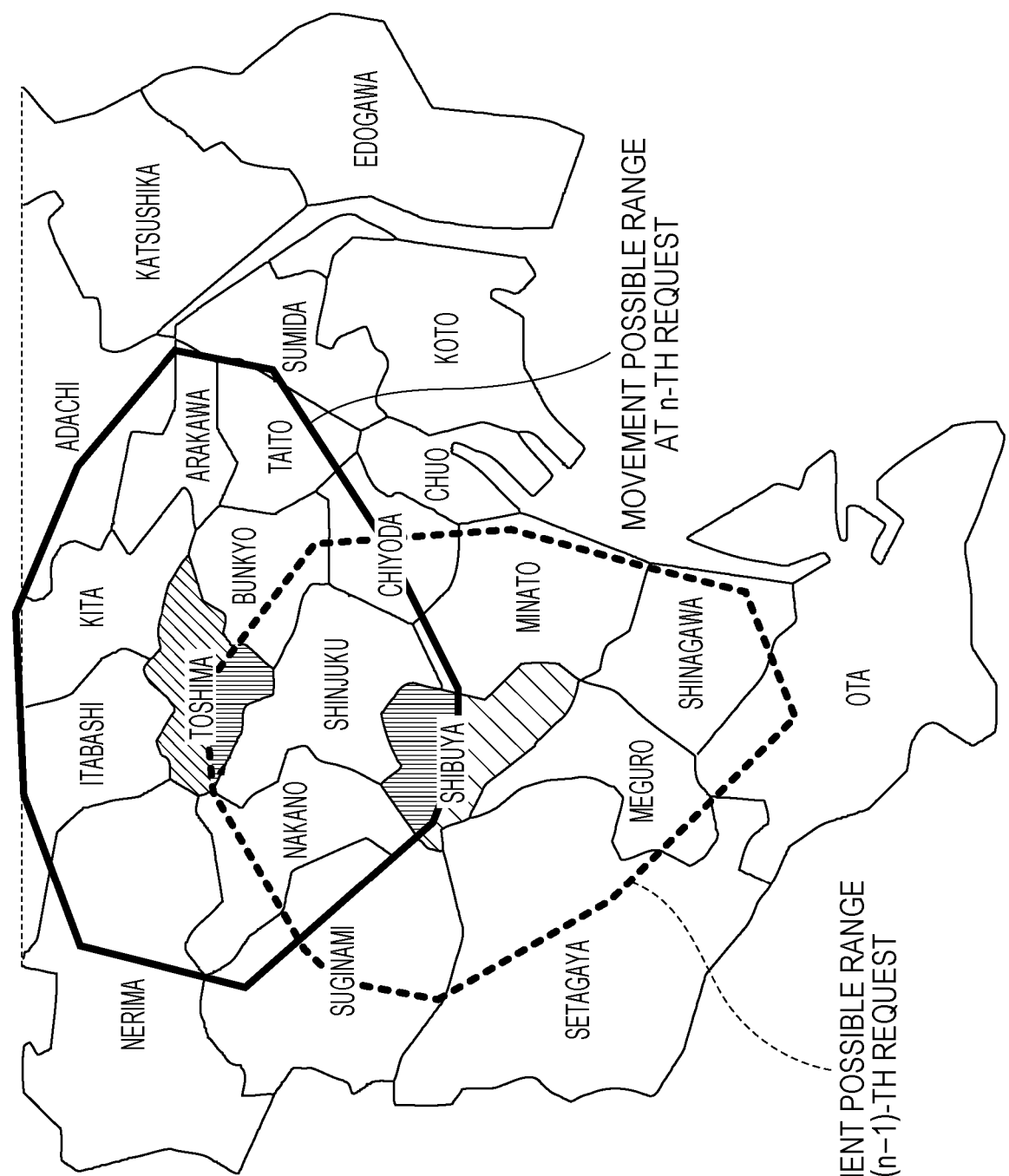
FIGS. 17A and 17B are diagrams (Part 8) for explaining the processing in FIGS. 6 to 8.

FIG. 17A illustrates a case where a presence region at the (n−1)-th request is Shibuya-city, and a presence region at the n-th request is Toshima-city. In this case, a range illustrated by the thick solid line is a movement possible range at the n-th request, and a range illustrated by the dashed line is a movement possible range at the (n−1)-th request, in FIG. 17A.

In FIG. 17A, the presence possible range (presence possible range within Shibuya-city) at the (n−1)-th request and the presence possible range at the n-th request (presence possible range within Toshima-city) are hatched. As is understood from FIG. 17A, the presence possible range at the (n−1)-th request is not 70% or more of the area of the entire Shibuya-city, and the presence possible range at the n-th request is not 70% or more the area of the entire Toshima-city.

Figure 17B:
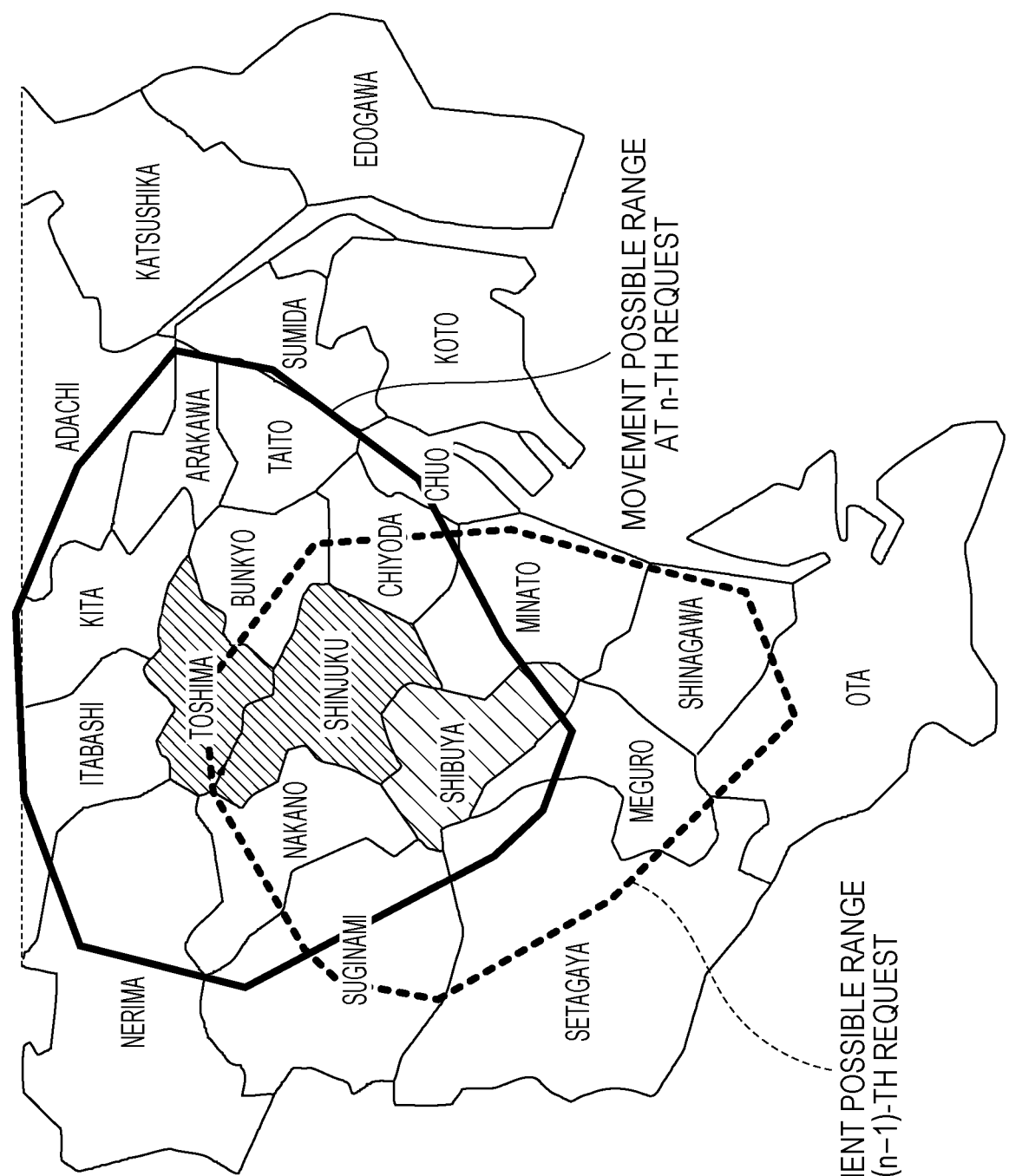
Figure 18A:
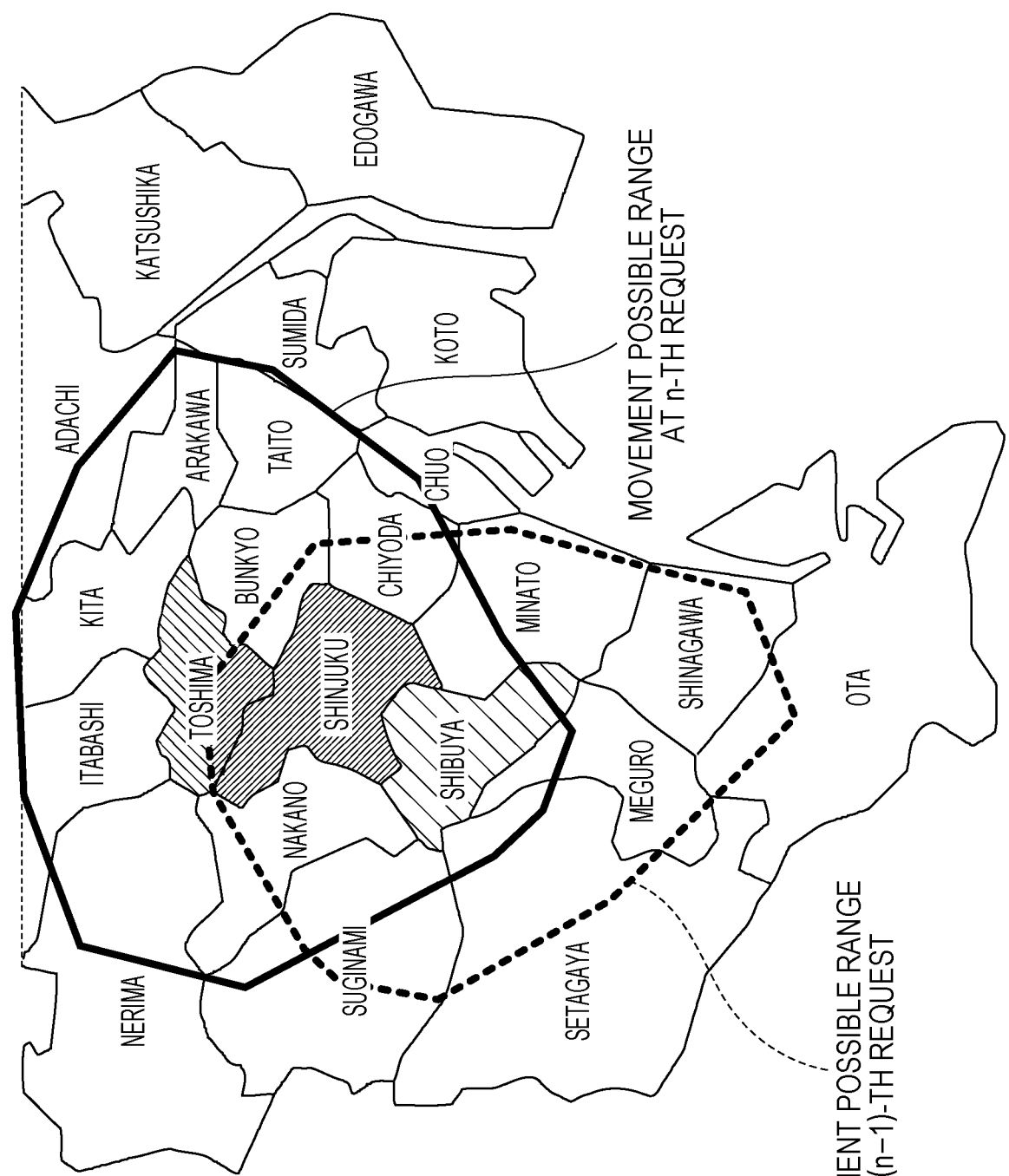
FIGS. 18A and 18B are diagrams (Part 9) for explaining the processing in FIGS. 6 to 8.
Figure 18B:
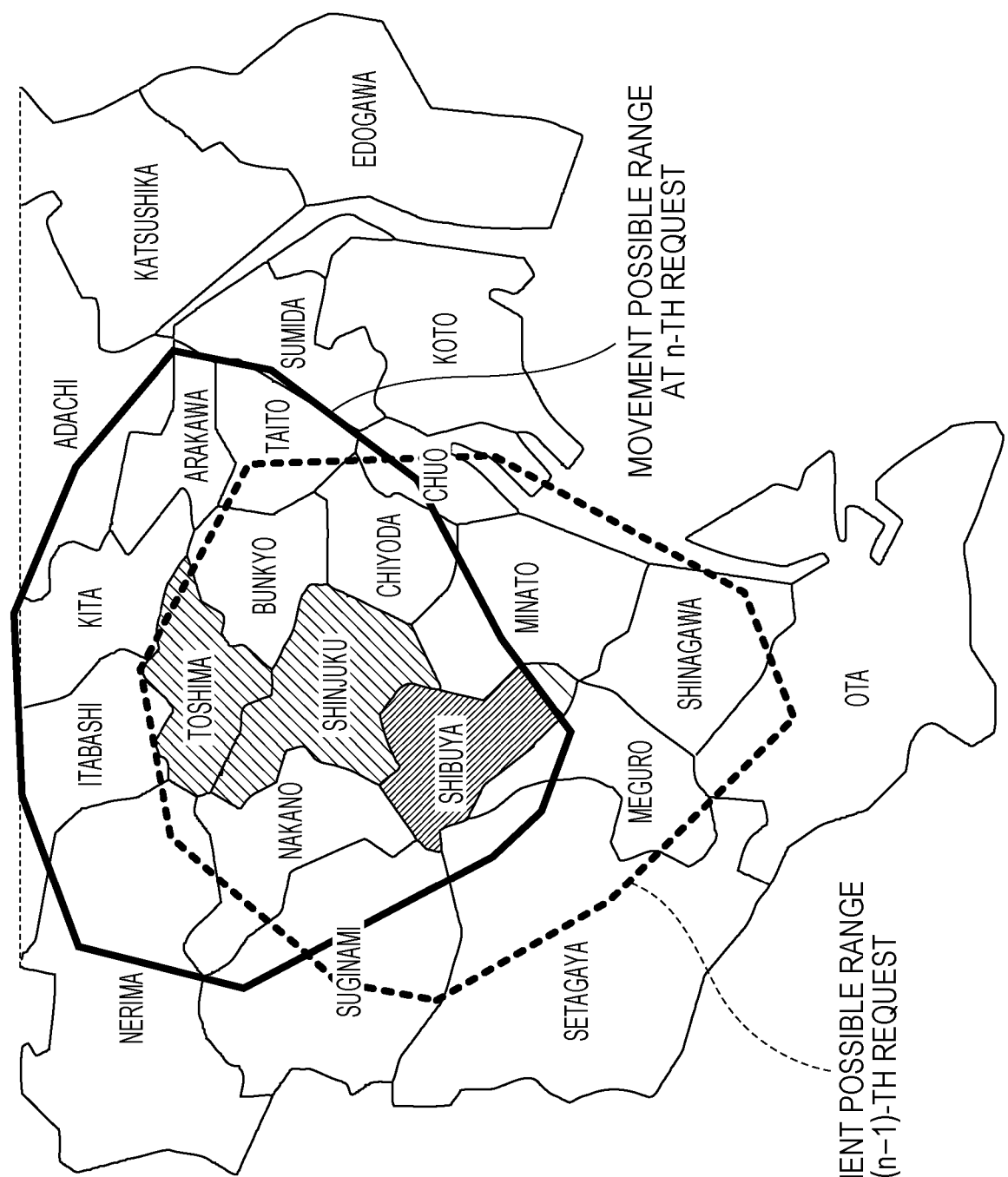

In this case, when the dummy region generation unit 28 adds Shinjuku-city to the presence region (Toshima-city) at the n-th request as illustrated in FIG. 17B, the movement possible range at the n-th request becomes wider than that in FIG. 17A. In this process, the presence possible range at the n-th request is a black painted region illustrated in FIG. 18A, and the presence possible range is 70% or more of the area of the entire Toshima-city. Moreover, the presence possible range at the (n−1)-th request is a black painted region illustrated in FIG. 18B, and the presence possible range of the area of the entire Shibuya-city is 70% or more. Accordingly, in this example, the dummy region generation unit 28 sets Shinjuku-city as a dummy region, and thus can reduce the privacy invasion.

Note that, with the abovementioned processes, the presence possible range at the (n−1)-th request changes, so that the information on the presence possible range of the (n−1)-th request in the request-posted region information log 42 is updated.

Note that, when the processing in FIG. 6 is repeated, in the personal data management server 20, when a (n+1)-th request is present, the processing similar to the above is executed by using the presence possible range having been obtained when the n-th request has been transmitted as a presence region at the n-th request.

As is clear from the description in the foregoing, in the present embodiment, the dummy region generation unit 28, the region integration unit 30, and the request transmission unit 32 implement the function as a transmission unit that transmits, when the privacy protection condition is not satisfied, a presence region at the n-th request and a dummy region other than the presence region, together with the request, to the service providing apparatus 10.

As is described in details in the foregoing, with the present embodiment, the privacy invasion determination unit 26 identifies, from a combination of information on a presence region (first region) including a location detected by the location detection device 189 of the user terminal 70 at a first time (at an n-th request) and information on a presence region (second region) including a location having been detected at a second time (at an (n−1)-th request) earlier than the first time, a presence possible range of the user terminal 70 at the n-th request and a presence possible range of the user terminal 70 at the (n−1)-th request (steps S38 and S48), and determines whether each presence possible range satisfies a privacy protection condition (preset condition for a presence possible range that may be known to a third party). Further, when the privacy protection condition is not satisfied, the dummy region generation unit 28 sets a region other than the presence region at the n-th request as a dummy region, and the request transmission unit 32 transmits the presence region and the dummy region (third region) integrated by the region integration unit 30, together with the request, to the service providing apparatus 10. Moreover, the service information reception unit 34 receives information relevant to the presence region and the dummy region from the service providing apparatus 10. With this, in the present embodiment, in a case where the privacy is invaded when the presence region at the n-th request and the presence region at the (n−1)-th request are analyzed in combination, the presence region and the dummy region are transmitted, so that it is possible to reduce the privacy invasion when the information relevant to the presence region is acquired. Moreover, in the present embodiment, for example, it is possible to reduce an increase in the amount of information that is received from the service providing apparatus 10, compared with a case where a wider region is set as abstracted location information for reducing the privacy invasion. Moreover, in the present embodiment, it is possible to transmit in real time the information on the presence region of the user terminal 70 to the service providing apparatus 10, so that the user terminal 70 is capable of acquiring in real time the information relevant to the presence region.

Moreover, in the present embodiment, the dummy region generation unit 28 transmits the presence region at the n-th request and the dummy region before the n-th request is transmitted to confirm that the privacy protection condition is satisfied (step S66). This can reliably reduce the privacy invasion.

Moreover, in the present embodiment, until the privacy protection condition is satisfied, a dummy region is added one after another (steps S64 and S66). With this, it is possible to achieve the minimal dummy region to be transmitted. Moreover, achieving the minimal dummy region to be transmitted can reduce the amount of information relevant to the dummy region received from the service providing apparatus 10.

Moreover, in the present embodiment, the service information selection unit 36 selects the information relevant to the presence region from the information received from the service providing apparatus 10, and transmits the selected information to the user terminal 70. With this, it is possible to protect the privacy of the user in the user terminal 70 without lowering the quality of the information provided by the service providing apparatus 10.

Although the abovementioned embodiment has described a case where whether the presence possible range satisfies the privacy protection condition is determined based on the area of the presence possible range, embodiments are not limited to this. For example, whether the privacy protection condition is satisfied may be determined based on the length of a road included in the presence possible range. In this case, the privacy invasion determination unit 26 can determine that the privacy protection condition is satisfied if the ratio of the length of the road included in the presence possible range to the length of all the road included in the presence region is a predetermined ratio or more or if the length of the road included in the presence possible range is a predetermined length or more. Moreover, for example, whether the privacy protection condition is satisfied may be determined based on the number of place names included in the presence possible range. In this case, the privacy invasion determination unit 26 can determine that the privacy protection condition is satisfied if the ratio of the number of place names included in the presence possible range to the number of all the place names included in the presence region is a predetermined ratio or more or if the number of place names included in the presence possible range is a predetermined number or more. Moreover, for example, whether the privacy protection condition is satisfied may be determined based on the number of landmarks included in the presence possible range. In this case, the privacy invasion determination unit 26 can determine that the privacy protection condition is satisfied if the ratio of the number of landmarks included in the presence possible range to the number of all the landmarks included in the presence region is a predetermined ratio or more or if the number of landmarks included in the presence possible range is a predetermined number or more.

Note that, in the abovementioned embodiment, when a movement method of the user can be identified or limited, by considering the identified or limited movement method, a movement possible range (range surrounded by the dashed line in FIG. 9A, range surrounded by the thick solid line in FIG. 10A, and the like) may be obtained. For example, when it is known that the user moves by car, a movement possible range may be obtained under the condition that the user moves at a velocity of 50 km per hour. Moreover, when it is known that the user moves on foot, a movement possible range may be obtained under the condition that the user moves at a velocity of 4 km per hour, and when it is known that the user moves by train, a movement possible range may be obtained under the condition that the user moves at a velocity of 110 km per hour. Note that, when the movement method of a user may not be identified, a movement possible range may be obtained by assuming that the user moves at the fastest velocity among those of the movement methods that can be selected.

Moreover, in the abovementioned embodiment, in accordance with the movement method, a movable range by the user may be limited. For example, when it is known that the user moves by car, a movement possible range may be limited to a range where roadways are connected. Moreover, when it is known that the user moves on foot, a movement possible range may be limited to a range where the user can enter on foot. Note that, the movement method by the user may be identified based on the vibration that is detected by an acceleration sensor included in the user terminal 70, for example, or the user may input information on the movement method into the user terminal 70.

Figure 19:
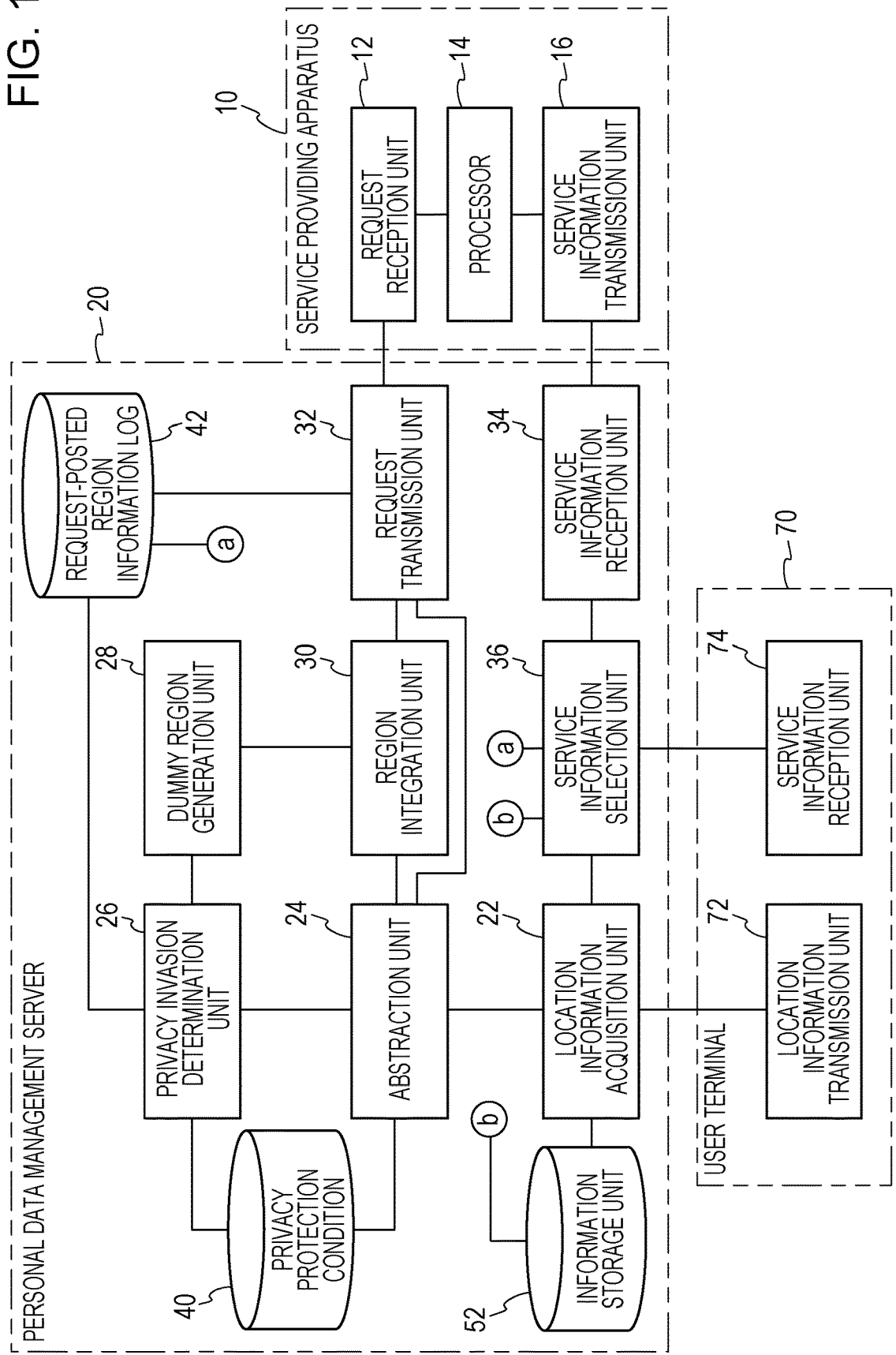
FIG. 19 is a diagram (Part 1) illustrating a modification example.

Note that, the personal data management server 20 as illustrated in FIG. 3 in the abovementioned embodiment may also include, as illustrated in FIG. 19, an information storage unit 52 serving as a storage unit that stores therein information (in other words, information on the dummy region) that the service information selection unit 36 has not transmitted to the user terminal 70. In this case, the location information acquisition unit 22 checks, when receiving a current location of the user terminal 70, whether information relevant to the received current location is stored in the information storage unit 52. Further, when the information relevant to the current location is stored in the information storage unit 52, the location information acquisition unit 22 notifies the service information selection unit 36 of the fact. When the service information selection unit 36 receives the notification, the service information selection unit 36 reads the information relevant to the current location from the information storage unit 52, and transmits the information relevant to the current location to the user terminal 70. This can reduce the number of communications between the personal data management server 20 and the service providing apparatus 10. Note that, information changes from moment to moment, so that it is preferable to manage the date/time when the information is stored in the database, and abandon the information after the predetermined time has elapsed form when the information has been stored in the database. Note that, in the example of FIG. 19, when a dummy region is selected (steps S64 and S66 in FIG. 8), a movement direction of the user terminal 70 (or a direction to which the user terminal 70 will move in the future) may be considered. In this case, based on the movement direction of the user terminal 70, a region (for example, city) that is present along the movement direction may be set with priority as a dummy region. This allows information to be used with high possibility in the future to be stored (pre-cached) in the information storage unit 52.

Figure 20:
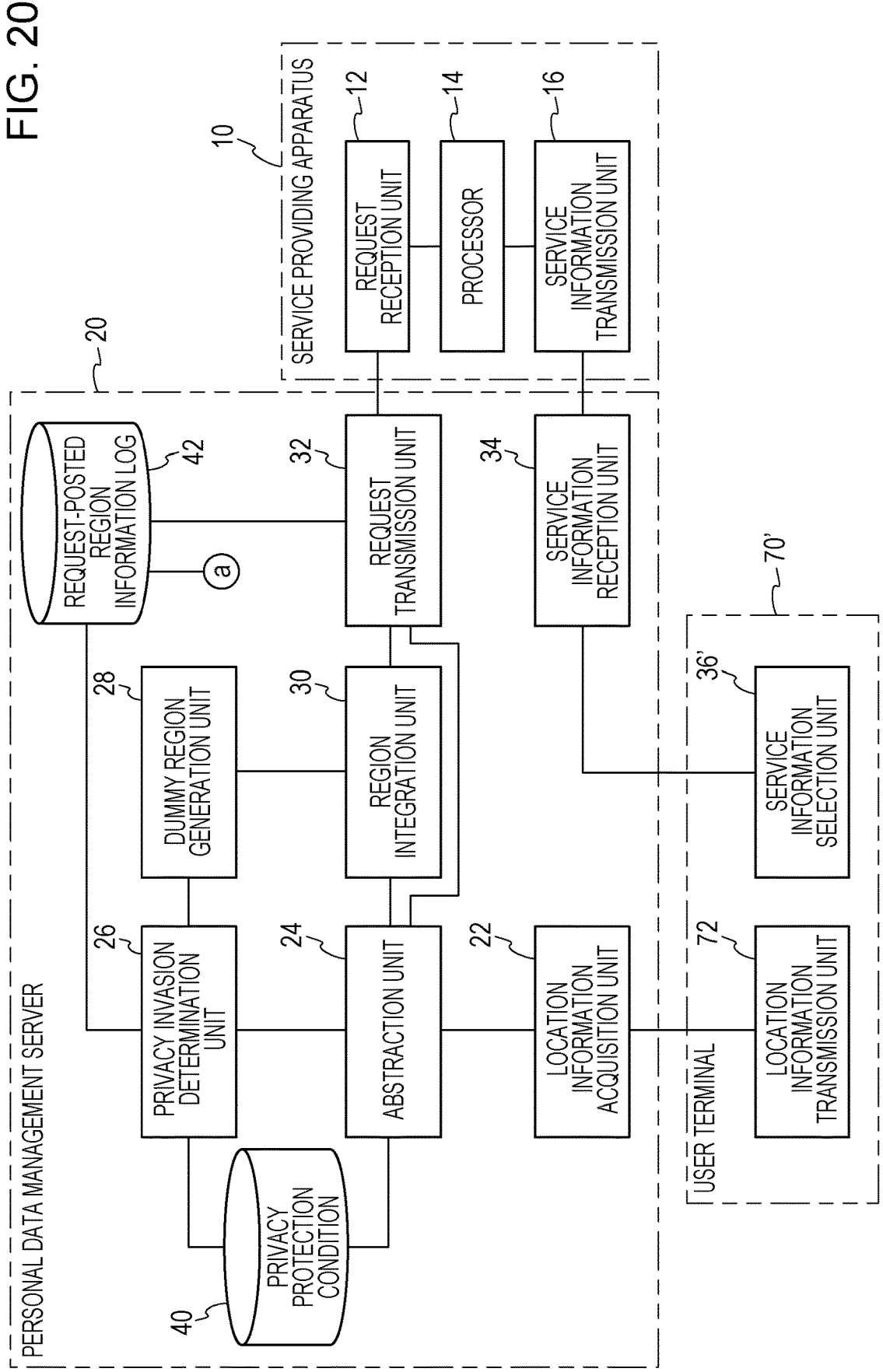
FIG. 20 is a diagram (Part 2) illustrating a modification example.

Note that, in the abovementioned embodiment, as illustrated in FIG. 3, the case where the personal data management server 20 includes the service information selection unit 36 has been described, however, the embodiment is not limited to this. For example, as illustrated in FIG. 20, the service information selection unit 36 of the personal data management server 20 may be omitted, and a user terminal 70' may include a service information selection unit 36' having a function similar to that of the service information selection unit 36.

Figure 21:
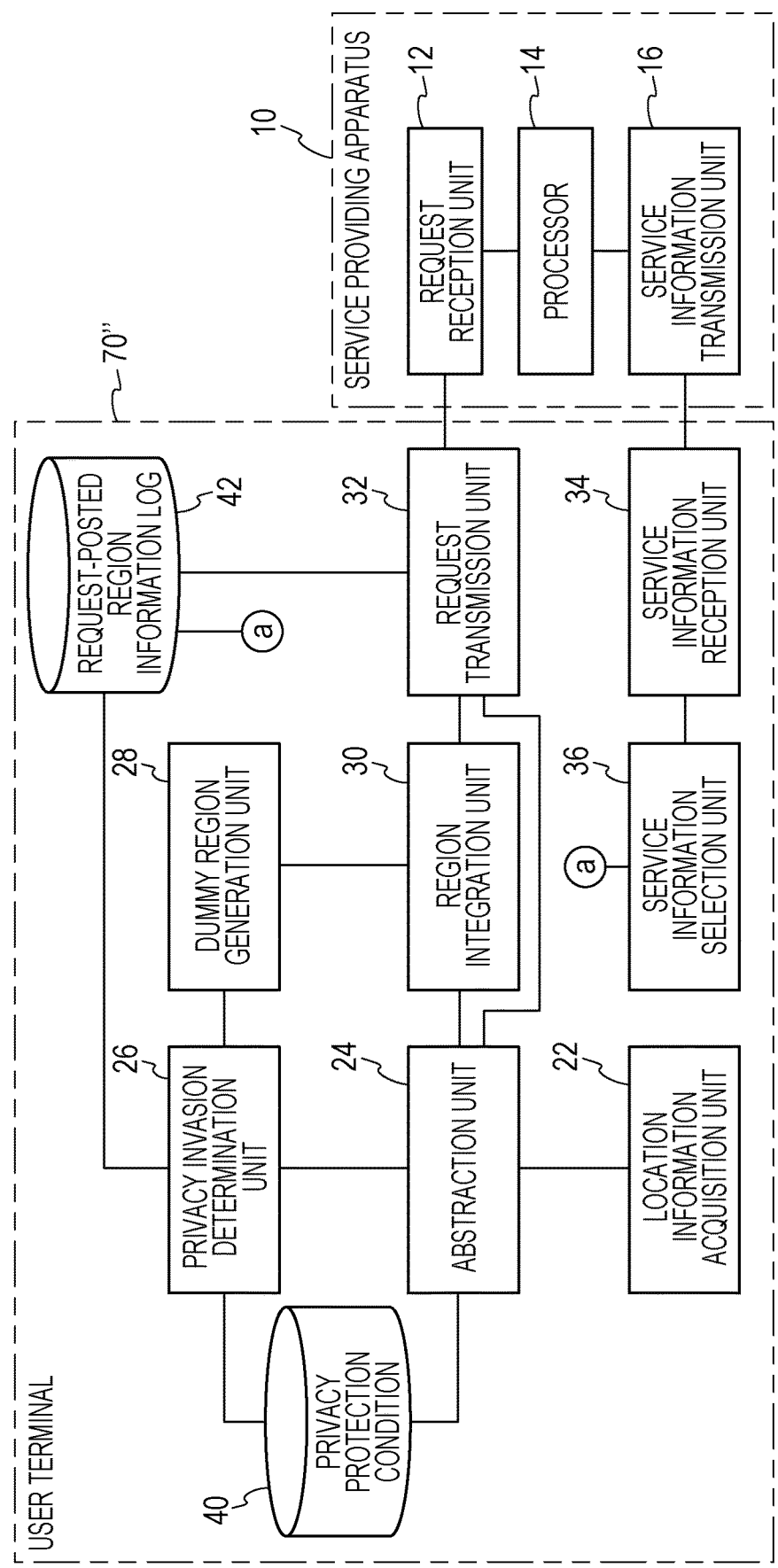
FIG. 21 is a diagram (Part 3) illustrating a modification example.

Moreover, in the abovementioned embodiment, as illustrated in FIGS. 1 and 3, the case where the information processing system 100 includes the personal data management server 20 has been described, however, the embodiment is not limited to this. In other words, as illustrated in FIG. 21, the personal data management server 20 may be omitted from the information processing system 100, and a user terminal 70" having a function of the personal data management server 20 may be used. Note that, the location information acquisition unit 22 of the user terminal 70" acquires the location information from the location detection device 189 in FIG. 2A.

Note that, the abovementioned processing functions can be implemented by a computer. In that case, a program in which a processing content of a function that a processing apparatus include is described is provided. The computer executes the program to implement the abovementioned processing function on the computer. The program in which the processing content is described can be recorded on a computer-readable storage medium (but excluding carrier waves).

When a program distributed, for example, the program is on the market in a form of portable storage media such as a digital versatile disc (DVD) or a compact disc read only memory (CD-ROM) on which the program is record. Moreover, it is also possible to store a program in a memory device of a server computer, and transfer the program to another computer from the server computer via a network.

The computer that executes a program stores, for example, a program that is recorded on the portable storage medium or a program that is transferred from the server computer, in the own memory device. Further, the computer reads the program from the own memory device, and executes the process in accordance with the program. Noted that the computer is also able to directly read a program from a portable storage medium, and execute the process in accordance with the program. Moreover, every time when a program is transferred to a computer from the server, the computer may successively execute the process in accordance with the received program.

The embodiment described above is an example of the preferred execution of the present disclosure. Note that, the present disclosure is not limited to the embodiment described above, but the various components can be modified without deviating the spirit of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to execute a process including:
storing, in the memory, information having been transmitted to an external apparatus as information on a region where a location detection device has been present;
identifying a presence possible range of the location detection device at a first time based on information on a second region, including a location that the location detection device detected at a second time earlier than the first time and having been already transmitted as information on the second region where the location detection device has been present at the second time to the external apparatus and information on an interval between the first time and the second time, and identifying a presence possible range of the location detection device at the second time based on information on a first region including a location that the location detection device detects at the first time and information on the interval, by referring to the memory;
determining whether at least one of the identified presence possible ranges satisfies a preset condition for a presence possible range where it is allowable that a location of the location detection device is known by a third party;
when the condition for the at least one of the identified presence possible ranges is not satisfied, transmitting the information on a third region including the first region and a region other than the first region, as information on a region where the location detection device is present at the first time, to the external apparatus; and
receiving information relevant to the third region from the external apparatus.

2. The information processing apparatus according to claim 1, wherein the determining includes determining, for each of the identified presence possible ranges, at least one of whether an area of the identified presence possible range satisfies the condition, whether a length of a road included in the identified presence possible range satisfies the condition, whether a number of place names included in the identified presence possible range satisfies the condition, and whether a number of preset landmarks included in the identified presence possible range satisfies the condition.

3. The information processing apparatus according to claim 1, wherein at least any one of the presence possible range of the location detection device at the first time and the presence possible range of the location detection device at the second time, which are identified from a combination of the information on the third region and the information on the second region, satisfies the condition.

4. The information processing apparatus according to claim 3, wherein the transmitting includes deciding the third region by adding one or more regions other than the first region one by one until the presence possible range of the location detection device at the first time and the presence possible range of the location detection device at the second time satisfy the condition.

5. The information processing apparatus according to claim 4, wherein an order of adding the regions other than the first region to the third region is based on a movement direction of the location detection device.

6. The information processing apparatus according to claim 1, wherein the identifying includes identifying the presence possible ranges based on a movement method set in advance.

7. The information processing apparatus according to claim 1, wherein the receiving further includes selecting information relevant to the first region from the received information relevant to the third region.

8. The information processing apparatus according to claim 7, wherein out of the received information relevant to the third region, information other than the information relevant to the first region is stored in the memory.

9. An information processing system comprising:
a terminal including a location detection device; and
an information processing apparatus acquiring information on a location detected by the location detection device of the terminal; the information processing apparatus including:
a memory; and
a processor coupled to the memory and configured to execute a process including:
storing, in the memory, information having been transmitted to an external apparatus as information on a region where the location detection device has been present;
identifying a presence possible range of the location detection device at a first time based on information on a second region, including a location that the location detection device detected at a second time earlier than the first time and having been already transmitted as information on the second region where the location detection device has been present at the second time to the external apparatus and information on an interval between the first time and the second time, and identifying a presence possible range of the location detection device at the second time based on information on a first region including a location that the location detection device detects at the first time and information on the interval, by referring to the memory;
determining whether at least one of the identified presence possible ranges satisfies a preset condition for a presence possible range where it is allowable that a location of the location detection device is known by a third party;

when the condition for the at least one of the identified presences possible ranges is not satisfied, transmitting the information on a third region including the first region and a region other than the first region, as information on a region where the location detection device is present at the first time, to the external apparatus; and receiving information relevant to the third region from the external apparatus.

10. A non-transitory computer-readable storage medium having stored a privacy protection program for causing a computer to perform a process comprising:

storing, in a memory, information having been transmitted to an external apparatus as information on a region where a location detection device has been present;

identifying a presence possible range of the location detection device at a first time information on a second region, including a location that the location detection device detected at a second time earlier than the first time and having been already transmitted as information on the second region where the location detection device has been present at the second time to the external apparatus and information on an interval between the first time and the second time, and identifying a presence possible range of the location detection device at the second time based on information on a first region including a location that the location detection device detects at the first time and information on the interval, by referring to the memory;

determining whether at least one of the identified presence possible ranges satisfies a preset condition for a presence possible range where it is allowable that a location of the location detection device is known by a third party;

when the condition for the at least one of the identified presence possible ranges is not satisfied, transmitting the information on a third region including the first region and a region other than the first region, as information on a region where the location detection device is present at the first time, to the external apparatus; and receiving information relevant to the third region from the external apparatus.

11. The storage medium according to claim 10, wherein the determining includes determining, for each of the identified presence possible ranges, at least one of whether an area of the identified presence possible range satisfies the condition, whether a length of a road included in the identified presence possible range satisfies the condition, whether a number of place names included in the identified presence possible range satisfies the condition, and whether a number of preset landmarks included in the identified presence possible range satisfies the condition.

12. The storage medium according to claim 10, wherein at least any one of the presence possible range of the location detection device at the first time and the presence possible range of the location detection device at the second time, which are identified from a combination of the information on the third region and the information on the second region, satisfies the condition.

13. The storage medium according to claim 12, wherein the transmitting includes deciding the third region by adding one or more regions other than the first region one by one until the presence possible range of the location detection device at the first time and the presence possible range of the location detection device at the second time satisfy the condition.

14. The storage medium according to claim 13, wherein an order of adding the regions other than the first region to the third region is based on a movement direction of the location detection device.

15. The storage medium according to claim 10, wherein the identifying includes identifying the presence possible ranges based on a movement method set in advance.

16. The storage medium according to claim 10, wherein the receiving further includes selecting information relevant to the first region from the received information relevant to the third region.

17. The storage medium according to claim 16, wherein out of the received information relevant to the third region, information other than the information relevant to the first region is stored in the memory.

* * * * *